US012724800B2

(12) United States Patent
Higgins et al.

(10) Patent No.: US 12,724,800 B2
(45) Date of Patent: Sep. 1, 2026

(54) FILE SEARCH

(71) Applicant: GOOGLE LLC, Mountain View, CA (US)

(72) Inventors: Krystal Rose Higgins, Balgowlah (AU); Benjamin Thomas Hartney, Palm Beach (AU); Simon Walter Hangl, Munich (DE); Ameet Jani, Campbell, CA (US); Mirco Franz, Voehringen (DE); Admir Hadžić, Bodenkirchen (DE); Andrey Rayskiy, Munich (DE)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/807,732

(22) Filed: Aug. 16, 2024

(65) Prior Publication Data

US 2025/0061137 A1 Feb. 20, 2025

Related U.S. Application Data

(60) Provisional application No. 63/520,298, filed on Aug. 17, 2023.

(51) Int. Cl.

| | |
|---|---|
| ***G06F 16/332*** | (2025.01) |
| ***G06F 16/338*** | (2019.01) |
| ***G06F 16/35*** | (2025.01) |
| ***G06F 16/383*** | (2019.01) |

(52) U.S. Cl.

CPC ........ *G06F 16/3323* (2019.01); *G06F 16/338* (2019.01); *G06F 16/35* (2019.01); *G06F 16/383* (2019.01)

(58) Field of Classification Search

CPC .... G06F 16/3323; G06F 16/338; G06F 16/35; G06F 16/383

See application file for complete search history.

(56) References Cited

U.S. PATENT DOCUMENTS

| | | | | |
|---|---|---|---|---|
| 2016/0012125 | A1 | 1/2016 | Franceschini et al. | |
| 2017/0286522 | A1* | 10/2017 | Hohwald | G06F 16/438 |
| 2022/0294470 | A1* | 9/2022 | de Abreu Pinho | G06F 16/17 |
| 2024/0045890 | A1* | 2/2024 | Nguyen | G06Q 40/02 |
| 2024/0134908 | A1* | 4/2024 | Mahfuz | G06F 16/638 |
| 2024/0202173 | A1* | 6/2024 | Schillace | G06F 16/24573 |

(Continued)

OTHER PUBLICATIONS

"Auto-GPT", Wikipedia (https://en.wikipedia.org/wiki/Auto-GPT), printed Aug. 12, 2024, 5 pages.

(Continued)

*Primary Examiner* — William Spieler

(74) *Attorney, Agent, or Firm* — Brake Hughes Bellermann LLP

(57) ABSTRACT

A method may receive a query. A method may obtain a representation of the query, the representation approximating content of the query. A method may determine a set of files accessible by an operating system that are relevant to the query by comparing the representation of the query with representations of files stored in an index, the files in the set of files having representations meeting a similarity threshold with the representation of the query. A method may cause a display of a response to the query, the response identifying the files in the set of files as relevant to the query.

27 Claims, 23 Drawing Sheets

(56) References Cited

U.S. PATENT DOCUMENTS

| | | | | |
|---|---|---|---|---|
| 2024/0220530 | A1* | 7/2024 | Wilkins | G06F 16/433 |
| 2024/0362286 | A1* | 10/2024 | He | G06F 16/93 |
| 2024/0370479 | A1* | 11/2024 | Hudetz | G06F 16/316 |
| 2025/0004886 | A1* | 1/2025 | Wuest | G06F 11/1469 |
| 2025/0005072 | A1* | 1/2025 | Salowitz | G06F 16/9035 |

OTHER PUBLICATIONS

International Search Report and Written Opinion for PCT Application No. PCT/US2024/042886, mailed on Feb. 3, 2025, 20 pages.

* cited by examiner

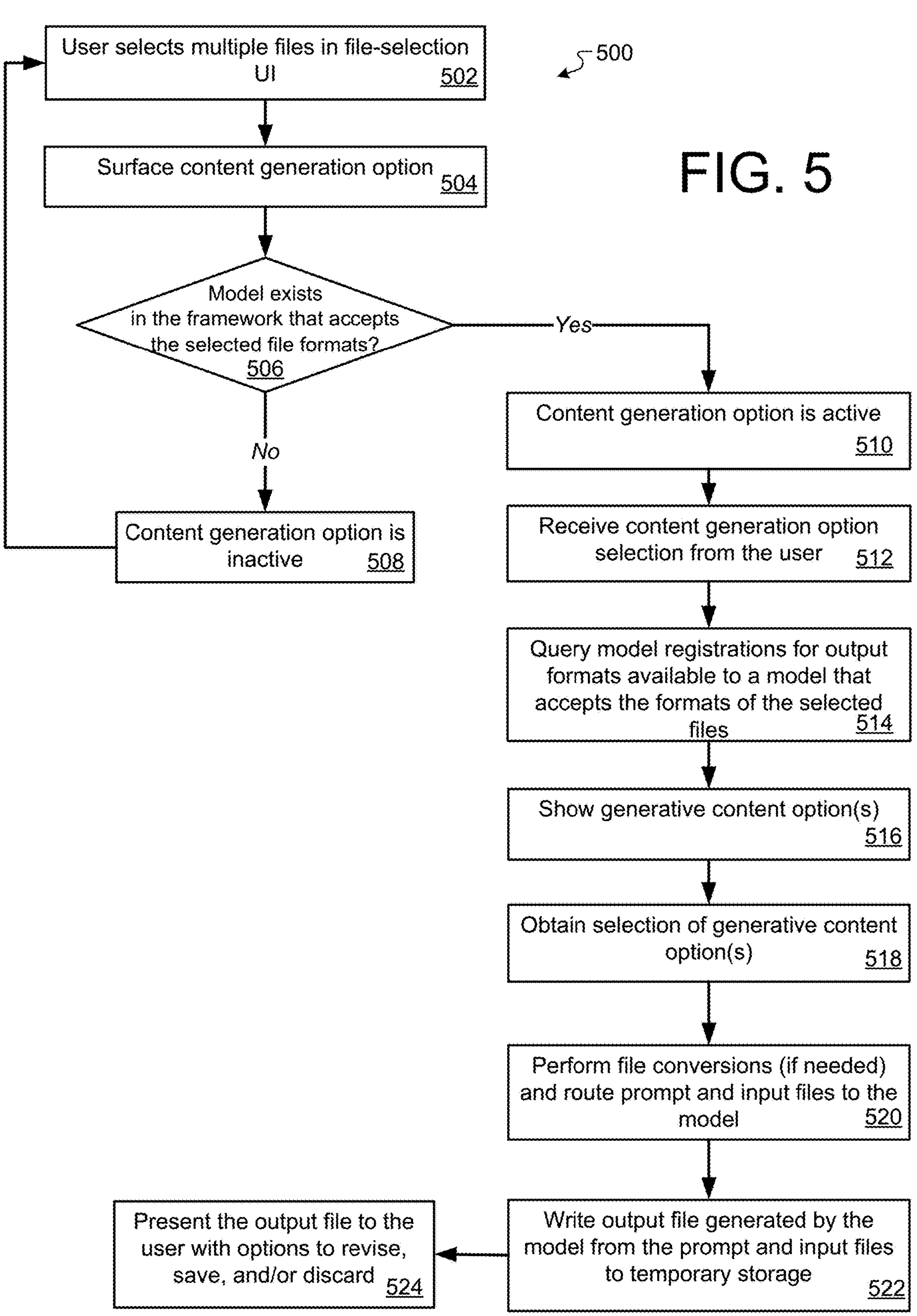
500
FIG. 5
User selects multiple files in file-selection UI 502
Surface content generation option 504
Model exists in the framework that accepts the selected file formats? 506
Yes
No
Content generation option is inactive 508
Content generation option is active 510
Receive content generation option selection from the user 512
Query model registrations for output formats available to a model that accepts the formats of the selected files 514
Show generative content option(s) 516
Obtain selection of generative content option(s) 518
Perform file conversions (if needed) and route prompt and input files to the model 520
Write output file generated by the model from the prompt and input files to temporary storage 522
Present the output file to the user with options to revise, save, and/or discard 524

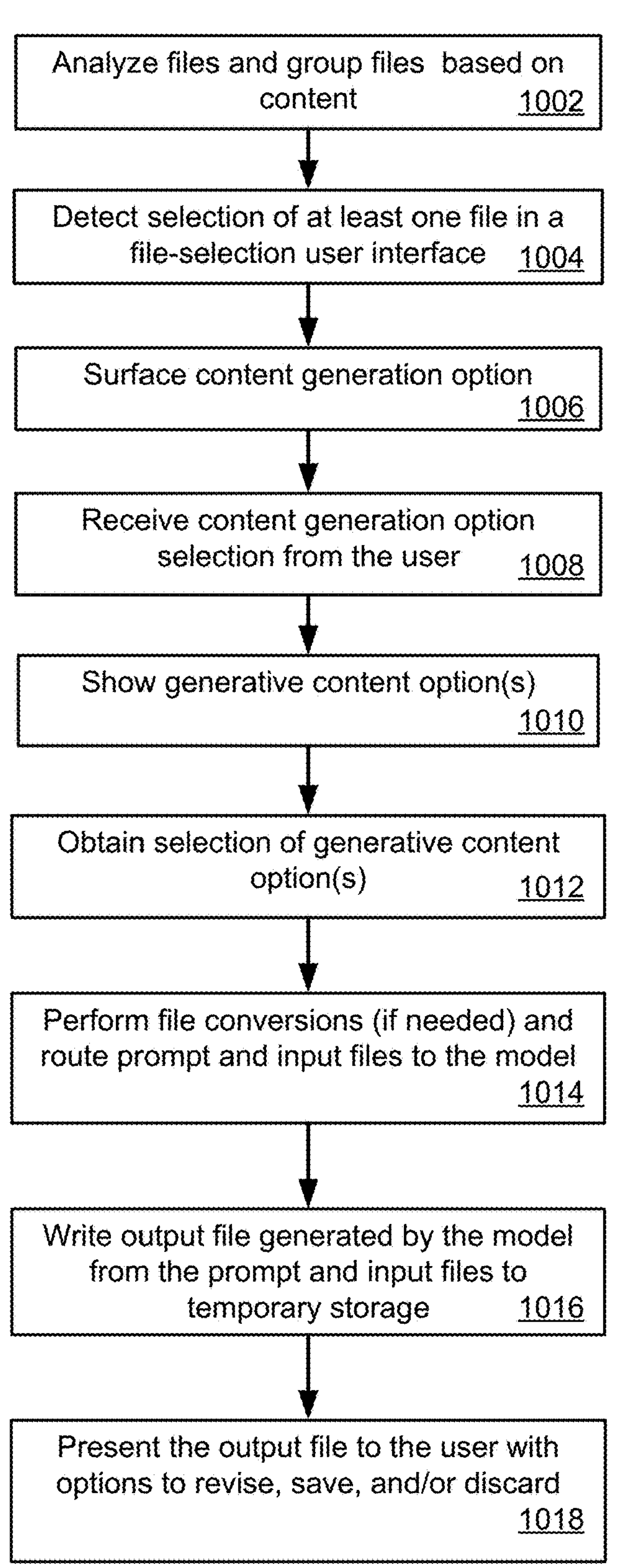
FIG. 10

1100

Recent
This computer
My files
Downloads
Play files
Cloud storage
Folder 1
Folder 2
Folder 3
Folder 4
Folder 5
Folder 6
Folder 7
Trash My files > Downloads

| Name ↓ | Size | Type | Date modified |
|---|---|---|---|
| Adoption applicants | 240 KB | Folder | Today 3:00 PM |
| Puppy info | 480 KB | Slides | Today 10:30 AM |
| School presentation | 110 KB | Slides | Feb 11, 2022 10.00 AM |
| Donations | 720 KB | Doc | Jan 16, 2022 10:30 AM |
| Rent receipt | 1.5 MB | PDF | Today 10:30 AM |
| Our doggo | 1.2 MB | PDF | Today 10:30 AM |
| Donations | 800 KB | PDF | Today 10:30 AM |
| Vacation recap mo.. | 12.2 MB | PNG | Today 10:30 AM |
| Photo 23838 | 4.2 MB | PNG | Today 10:30 AM |
| IMG 6534 | 4.2 MB | PNG | Today 10:30 AM |
| IMG 2344 | 3.1 MB | PNG | Today 10:30 AM |
| IMG 2345 | 2.2 MB | PNG | Today 10:30 AM |
| Estimated tax pay.. | 4.2 MB | PDF | Today 10:30 AM |

1405

Generate

FILE SEARCH

CROSS REFERENCE TO RELATED APPLICATION

This application claims the benefit of U.S. Provisional Application No. 63/520,298, filed Aug. 17, 2023, the disclosure of which is incorporated herein by reference in its entirety.

BACKGROUND

Current methods to search for files on a computing device related to a query include navigating to a file search application and executing a search for files using one or more query terms. Because the related files returned as query results are identified by searching for the query terms in the files, the results are limited to the user's ability to select query terms that follow terminology used in the files exactly.

Some file systems support merging of user-selected files, e.g., combining pages from multiple PDF files into a single PDF document, taking the pages as they are. This is done without changes in content and without understanding the actual content of the pages.

SUMMARY

The present disclosure describes methods that provide a novel way for a user to generate answers to queries that can utilize information found in the files in addition to information found on the internet. Example implementations include receiving a query, identifying files relevant to the query based on a representation of the content of files on the user's computing device, and using the identified files as context for a response generated by a generative model (e.g., an embedding generated by a large language model, a language model, or a generative AI). Generating the response may include extracting the content from the identified files or a user-selected subset of the identified files that is selected by a user. The present disclosure further describes methods of generating an index by embedding content for files on the user device and associating each with a respective reference (e.g., a file path or URL) to the original content.

The present disclosure further describes methods to multi-select files in a filesystem and then use a generative model to create new content based on the content of the selected files and a query from the user. In some implementations, the user may select files that were identified as responsive to a query, as described above.

In some aspects, the techniques described herein relate to a method including: receiving a query; obtaining a representation of the query, the representation approximating content of the query; determining a set of files accessible by an operating system that are relevant to the query by comparing the representation of the query with representations of files stored in an index, the files in the set of files having representations meeting a similarity threshold with the representation of the query; and causing a display of a response to the query, the response identifying the files in the set of files as relevant to the query.

In some aspects, the techniques described herein relate to a system including: a processor; and a memory configured with instructions to: receive a query; obtain a representation of the query, the representation approximating content of the query; determine a set of files accessible by an operating system that are relevant to the query by comparing the representation of the query with representations of files stored in an index, the files in the set of files having representations meeting a similarity threshold with the representation of the query; and cause a display of a response to the query, the response identifying the files in the set of files as relevant to the query.

In some aspects, the techniques described herein relate to a computer-readable medium storing instructions that, when executed by at least one processor, cause a computing device to perform operations including: receive a query; obtaining a representation of the query, the representation approximating content of the query; determining a set of files accessible by an operating system that are relevant to the query by comparing the representation of the query with representations of files stored in an index, the files in the set of files having representations meeting a similarity threshold with the representation of the query; and causing a display of a response to the query, the response identifying the files in the set of files as relevant to the query.

In some aspects, the techniques described herein relate to a method including: receiving a file selected by a user; identifying, from a framework a generative model that accepts, as input, files of a file type represented by the file; providing a user interface that displays at least one output file type associated with the generative model and displays a prompt input area; receiving a prompt from the prompt input area and an output file type selected from the at least one output file type; providing the prompt and the file to the generative model, the generative model generating new content in an output file based on the prompt and content of the file; and saving the output file.

In some aspects, the techniques described herein relate to a method including: receiving a set of files selected by a user; providing a user interface that displays at least one output file type associated with a generative model and displays a prompt input area; receiving a prompt from the prompt input area and an output file type selected from the at least one output file type; routing the set of files to two or more models in a framework, respective models of the two or more models taking as input at least one file from the set of files having a file type that the model accepts as input, the framework providing an output file based on the prompt and content of the set of files; and saving the output file.

In some aspects, the techniques described herein relate to a method including: receiving a set of files selected by a user; providing a user interface that displays at least one output file type and displays a prompt input area; receiving a prompt from the prompt input area and an output file type selected from the at least one output file type; providing the prompt and the set of files to a framework, the framework providing the prompt and at least one file in the set of files having a first file type to a first model that accepts files having the first file type and providing the prompt and at least one file in the set of files having a second file type to a second model that accepts files having the second file type, the framework compiling output from the first model and the second model to generate new content in an output file; and saving the output file.

In some aspects, the techniques described herein relate to a system including: a processor; and a memory configured with instructions to: receive a file selected by a user; identify, from a framework a generative model that accepts, as input, files of a file type represented by the file; provide a user interface that displays at least one output file type associated with the generative model and displays a prompt input area; receive a prompt from the prompt input area and an output file type selected from the at least one output file type; provide the prompt and the file to the generative model, the generative model generating new content in an output file based on the prompt and content of the file; and save the output file.

BRIEF DESCRIPTION OF THE DRAWINGS

FIG. 5 illustrates an example flowchart of a method for generating content from multiple files in a system, according to an implementation.

FIG. 10 illustrates an example flowchart of a method 1000 for proactively suggesting generative content from multiple files in a system, according to an implementation.

FIG. 14 illustrates an example file-selection user interface in which proactive content generation is suggested, according to an implementation.

DETAILED DESCRIPTION

Figure 1A:
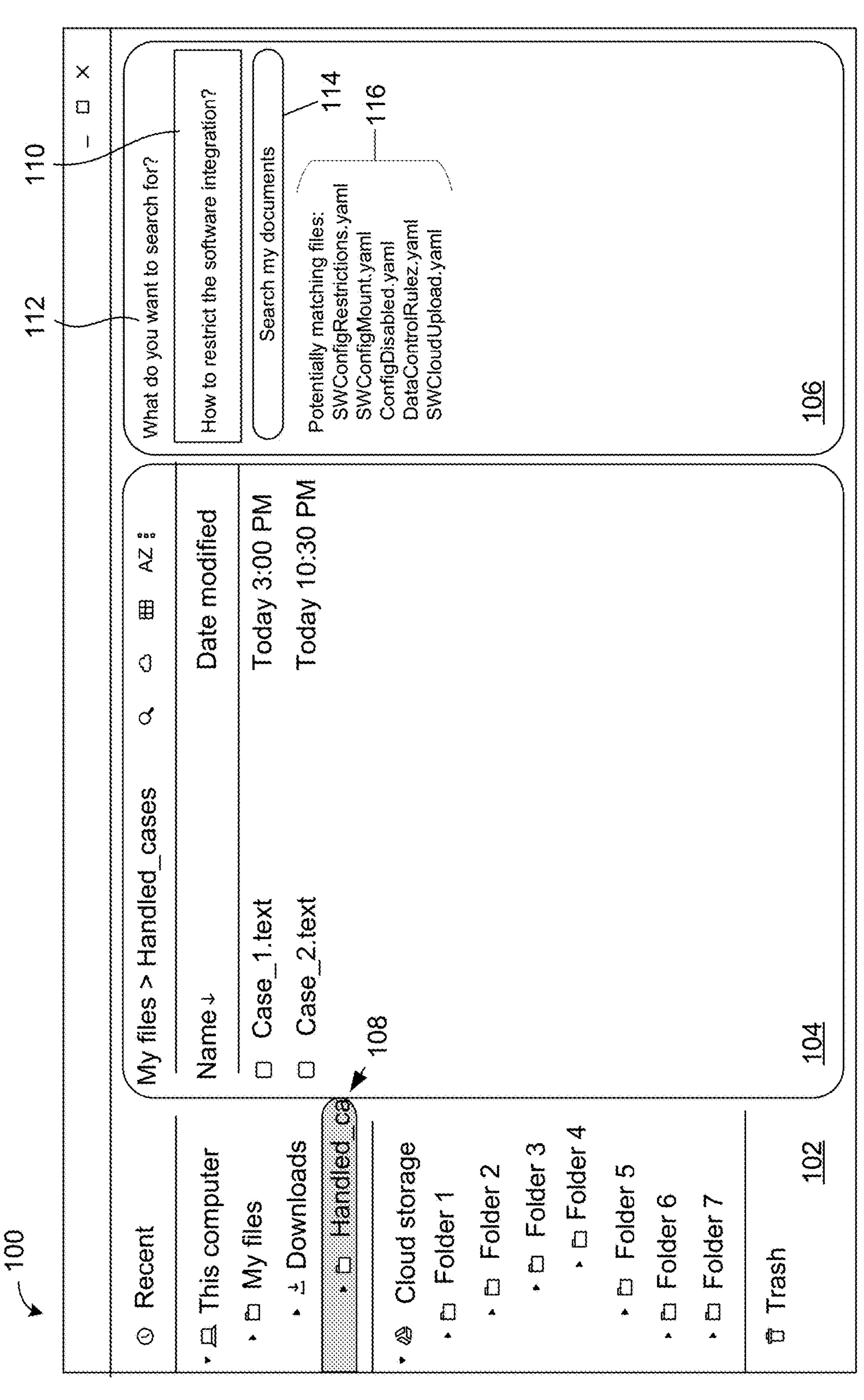
FIGS. 1A, 1B, 1C, and 1D illustrate an example file search user interface.

Disclosed implementations provide an interface and underlying structures for supporting a natural-language interface for searching a personal file repository. Specifically, disclosed implementations allow users to identify content in files that is related to a user query (i.e., prompt). Implementations include receiving a query from a user, embedding the query, and determining, from an index of embeddings of files, files that are most similar to the query embedding. The files that are most similar, e.g., based on an embedding similarity, are considered relevant files. The relevant files can be presented to the user. The relevant files can be used as context for the query, which may be provided to a generative model as input. The generative model may provide a natural language response to the query, based on the content of the relevant files. This response may be provided to the user. In implementations, the response may be used to synthesize new files from the response.

Disclosed implementations allow users to multi-select files in the filesystem and then use technologies like generative AI to create new content based on the content of the selected files and a query from the user. Implementations support utilitarian new content generation and creative content generation. For example, implementations may enable a user to select multiple research documents and/or video clips to create a new research synthesis presentation. Implementations may also select a random set of images, movies, and/or text documents and generate a film based on the randomly selected set.

A technical problem with existing searches of personal file systems is that files can only be identified using matches to file identifiers or authors or match contents based on verbatim search terms. Such searches are inefficient and restrictive. Because the search terms must match text found in a file or file identifier to identify that file, a user may be unable to locate a file or may have to provide multiple searches to find the most relevant file. If a synonym was used in a file instead of the exact search term, that file may not appear as a result. Even when the search terms match content in a file, such a file may only be tangentially related to the intent of the query.

Disclosed technical solutions describe embedding a user query (e.g., a query or a question) in an embedding space. In some implementations, the system may use a generative model to encode the query. In some implementations, other existing embedding solutions may be used. The encoded query may then be used to identify relevant files based on embedding similarity by searching an index of encoded content. With user permission, files in the user's personal file repository may be encoded in the embedding space and the encoded content may be associated with an identifier for the file. The encoded content in the index that is determined to be most similar to the encoded query, e.g. based on a cosine similarity or some other similar similarity measure, may be used as input to a generative model with the query to generate a response to the query. This enables the response to be based on the content of the relevant files. For example, the generative model may be trained to give weight to content provided with the query, which enables the generative model to synthesize information found in a user's file system and the Internet to generate responses to a query. In some examples, the generative model may be trained using webpage content from the Internet. In examples, a content extractor may be used to extract the content from a file to provide to the generative model. In examples, the index may include groupings of related encoded content. Once a grouping is identified, the most closely related file within the grouping may be further identified. In implementations, means may be provided to allow the user to delete embeddings and/or modify/delete an index. Thus, implementations provide the user with control over what file information is collected, how that information is used, and what information is provided to the user.

Implementations help the user find information they seek more efficiently. Whereas previously a user could only use a file search application to find files with the same query terms used, and some of those results may include files that are not related to the meaning of the query terms while other results may be missing closely related files, the methods described herein allow a user to identify files based on their related meaning. In implementations, users may identify files related to a query more quickly and accurately based on the semantic meaning of the files and the query.

A further technical problem exists for generating new content efficiently. Currently, there are no easy ways to efficiently generate new, meaningful content based on multiple files that a user may already have, particularly where the files are of disparate formats or types. If a user wanted to actually make net new content from a multi-selection of files—for example, to use the content from multiple financial documents to generate a single budget plan spreadsheet, or to use the content from multiple research papers to synthesize a literature review—the user needs to open those files in separate application windows, and synthesize contents manually. This can be resource intensive, which can be of particular importance for mobile computing devices with limited battery capacity. Current file systems lack any ability to create content based on files of different categories-such as creating a movie inspired by some images, sound references, and a PDF script without manual work.

Disclosed implementations provide a solution to the technical problem of quickly and efficiently synthesizing existing file content to generate new content. Implementations provide a generative framework and a corresponding interface that enables users to multi-select files within the file system (e.g., an operating system file system) and to select (implementations can suggest a variety of ways those files might be combined) or provide a prompt that guides the generation of new content based on the selected files. Implementations then use those files and the prompt to create net new content and files using the generative framework. Implementations may therefore generate new content from multiple files in a manner that is less resource intensive and requires fewer user inputs. Implementations create new content (new files) and do not overwrite existing files. The generative framework represents one or a set of generative AI models that are recognized & accessible by the file system. A generative framework may include, but is not limited to models including, PaLM2, AudioLM, and so forth. In some implementations, a developer can register a new generative model with the generative framework, making that model part of the generative framework registered and available to the file system. Such registration may allow the generative framework to be easily and dynamically updated with new capabilities as new generative models are developed. The models can be local (on device) or accessible via a Network. The generative framework may include both offline and online frameworks. The generative framework can have a basic configuration. The generative framework can have a proactive configuration. The generative framework can have a multimodal configuration.

Implementations increase productivity and creativity. For example, implementations enable users to create new content much more quickly; instead of having to open an application to dig into the application's proprietary generative AI functionality, or instead of typing lengthy prompts into a generative AI conversational assistant, the user can select multiple files and enter a much more simplified prompt. As another example, implementations allow users to be more creative by providing a platform for experimentation with different combinations of files, where combining content from disparate files (e.g., of different formats or types) may previously not have been possible or may have been computationally intensive and laborious. As non-limiting examples, implementations can take a selection of research papers (e.g., in PDF or a word processing format) and synthesize them into a research presentation, extract content from the research papers as footnotes that support another open document, and/or generate a science-fiction movie script based on the research papers. As other non-limiting specific examples, implementations may take a selection of images and blend them to create a single image for a desktop wallpaper, combine into a PDF or presentation, combine them into an expense report or tax return, and/or create a book based on them. The file system can be a file system of an operating system, a file system of an application, etc.

Semantic File Search

FIGS. 1A-1D depict an example file search user interface 100 during different phases of use, according to an implementation. As may be seen in FIG. 1A, the file search user interface 100 includes a folder section 102, a file section 104, and a query and response section 106. In implementations, the folder section 102 may include a file directory tree. In implementations, the file section 104 may include a list of files from a selected folder 108 highlighted in the folder section 102.

In implementations, the query and response section 106 may automatically appear when the file search user interface 100 is used. In implementations, the query and response section 106 may appear when selected, for example via a menu (e.g., a right click menu). The query and response section 106 may include a query box 110. In implementations, the query may be typed or entered by a user. With user consent, a suggestion query may be automatically generated based on context from within the file search user interface 100, any application open on a computing device, or any other data that the operation system may be able to provide. In the figure, the query box 110 is located next to introductory text 112, which may explain the purpose of the query box 110. The query initiation control 114 reads, "What do you want to search for?"

A query is an input to which a generative model is meant to respond. Queries can include instructions, questions, or any other type of input, depending on the intended use of the model. In examples, the query for the generative model may include instructions such as, "provide a summary of [content]" or, "generate an outline that will allow a user to skim the main points from [content]," where [content] can represent raw text or images from a file or the location of a file.

The query and response section 106 may further include a query initiation control 114, which may be used to send the query entered in the query box 110 to a generative model as input to generate a result. In the implementation of FIG. 1A, the query initiation control 114 is a button including the text, "Search my documents". In the implementation, the query initiation control 114 may offer the option to search documents because the selected folder 108 is selected.

A generative model is a type of machine-learning model that uses deep learning to generate human-like text or speech based on a query and a context. Generative models are trained to estimate the probability of encoded content, which includes a sequence of tokens (including words, emoji, etc.) in response to a query. Generative models are trained on vast amounts of data, typically in the form of text or speech. Using queries and context as inputs, generative models generate outputs or responses.

In implementations, the generative model may reside on a user device. In implementations, the generative model may reside on a server and, with user consent, content from a user device or the cloud may be sent to the server as input to the model.

Returning to the implementation of FIG. 1A, it may be seen that a user has entered a query, "How to restrict the software integration?" Upon selecting the query initiation control 114, a response 116 to the query may be generated by embedding the query and comparing it to encoded content in an index, as further described below with regards to FIG. 2A and method 200.

In the implementation, the response 116 is a list of "Potentially matching files." A user may select any of the files which are related to restricting software integration.

Figure 1B:
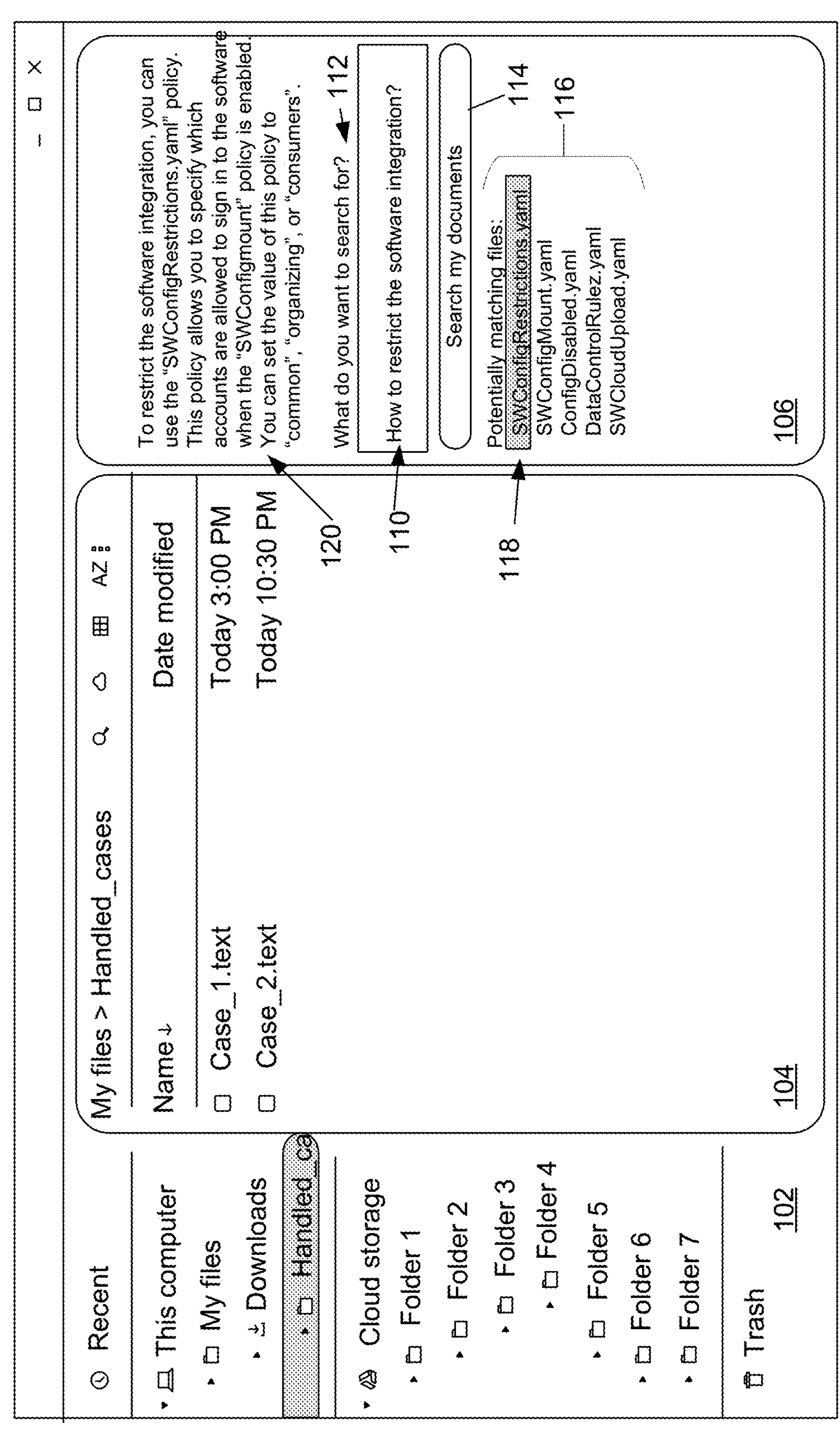

FIG. 1B depicts the file search user interface 100 after a user has entered a query into the query box 110 and selected a file 118 from the response 116. In the example implementation, selecting file 118 may cause the file search user interface 100 to generate a response 120. In implementations, the response 120 may be generated by extracting the content of the file 118 and using it as input to the generative model with the query that the user entered at the query box 110, "How to restrict the software integration?"

The response 120 in the example implementation provides advice about how to restrict a software integration with the SWConfigRestrictions.yaml file. In implementations, the response 120 may combine information received from the file 118 and/or webpages on the internet used to train the generative model. In this way, the methods described herein may provide descriptions that help a user understand how content in a file relates to subject matter represented by a query, thereby by providing further information from the Internet available in the generative model to supplement the content from the file.

In implementations where there is no query in the query box 110, the query may comprise one or more predetermined queries, such as "Generate a summary of this [content]."

Figure 1C:
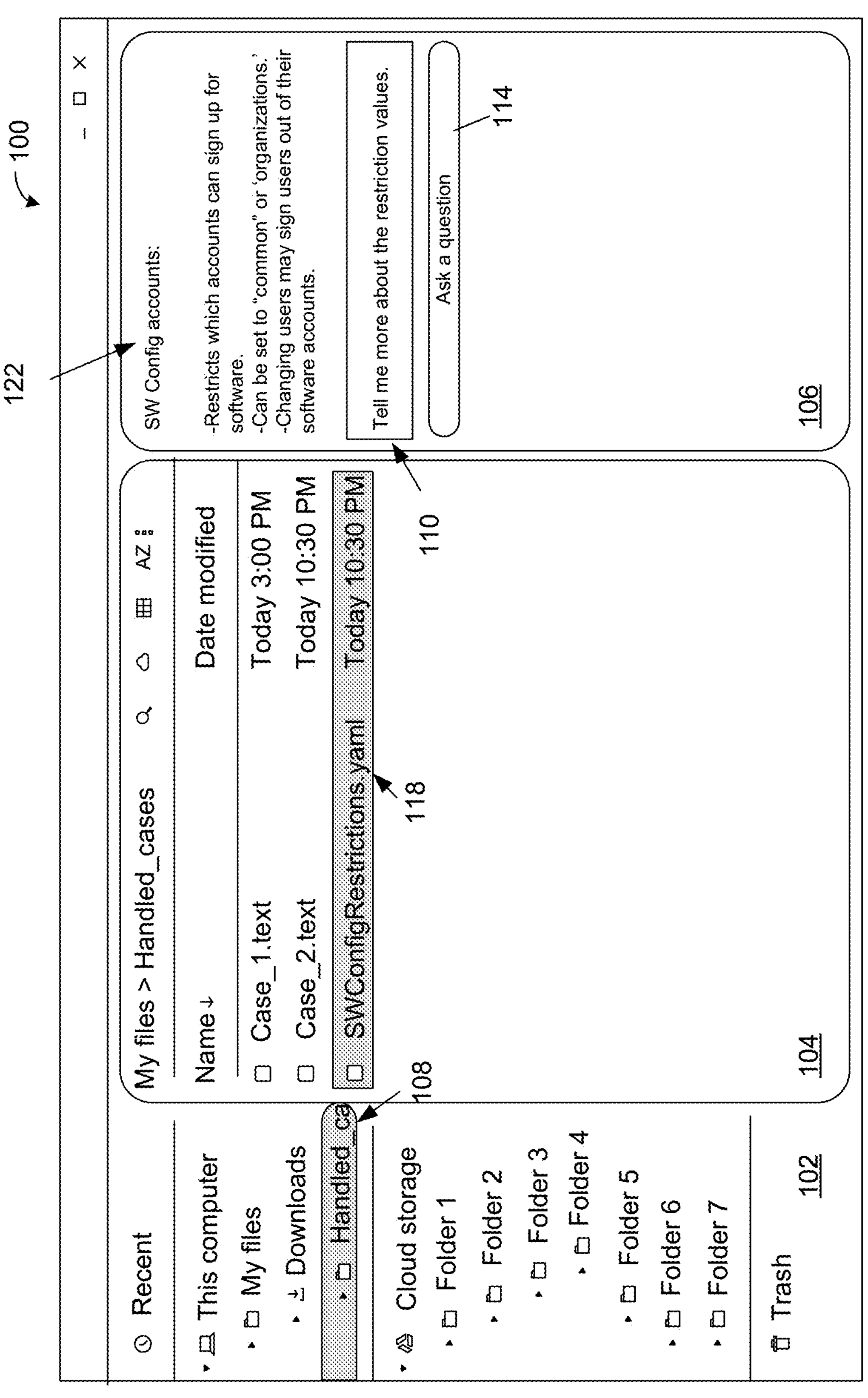

FIG. 1C depicts the file search user interface 100 after a user has selected the selected folder 108 and the file 118, which may be seen in the folder section 102 and the file section 104. In implementations, the file 118 may have been selected from the response 116 in FIG. 1B. In implementations, the file 118 may have been selected by navigating to the file via the folder section 102 and the file section 104.

In implementations, when the file 118 is selected in the file section 104, the response 122 may be displayed in the query and response section 106. In implementations, the response 122 may provide a description of the file 118. With user permission, the response 122 may be generated by executing a generative model with the file 118 and the query "Please provide a summary of the [file]" as inputs. With user permission, the response 122 may be generated by including further context such as previous queries used.

With the file 118 selected, the response section 106 includes the query box 110 and the query initiation control 114 with the text, "Ask a question." A query may be typed into the query box 110, for example: "Tell me more about the restriction values."

Figure 1D:
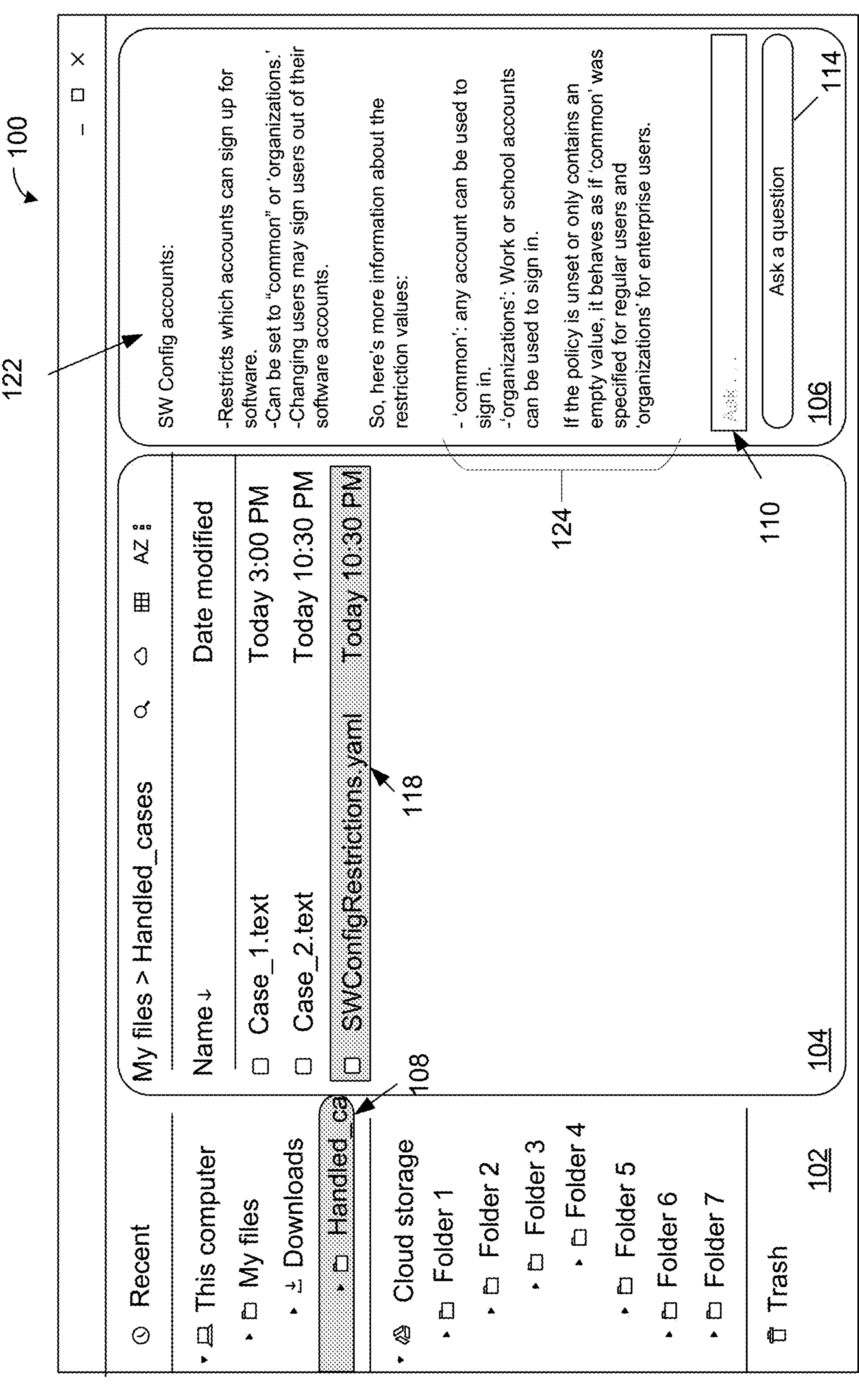

Upon selecting the query initiation control 114, the response 124 depicted in FIG. 1D may be displayed in the query and response section 106. In implementations, the response 124 may be displayed below the response 122. In implementations, the query box 110 and the query initiation control 114 may be displayed below the response 124, indicating that if there are further iterations of queries, the responses may be placed below the response 124. In implementations, a scroll bar may appear to a side of the query and response section 106 so that the older responses may still be visited.

In the example the response 124 explains more about what the restriction values 'common' and 'organizations' mean and includes a description of what happens if no policy is set. In implementations, the information provided in the response 124 may be provided by a combination of the file 118 and information from websites used to train the generative model.

Figure 2A:
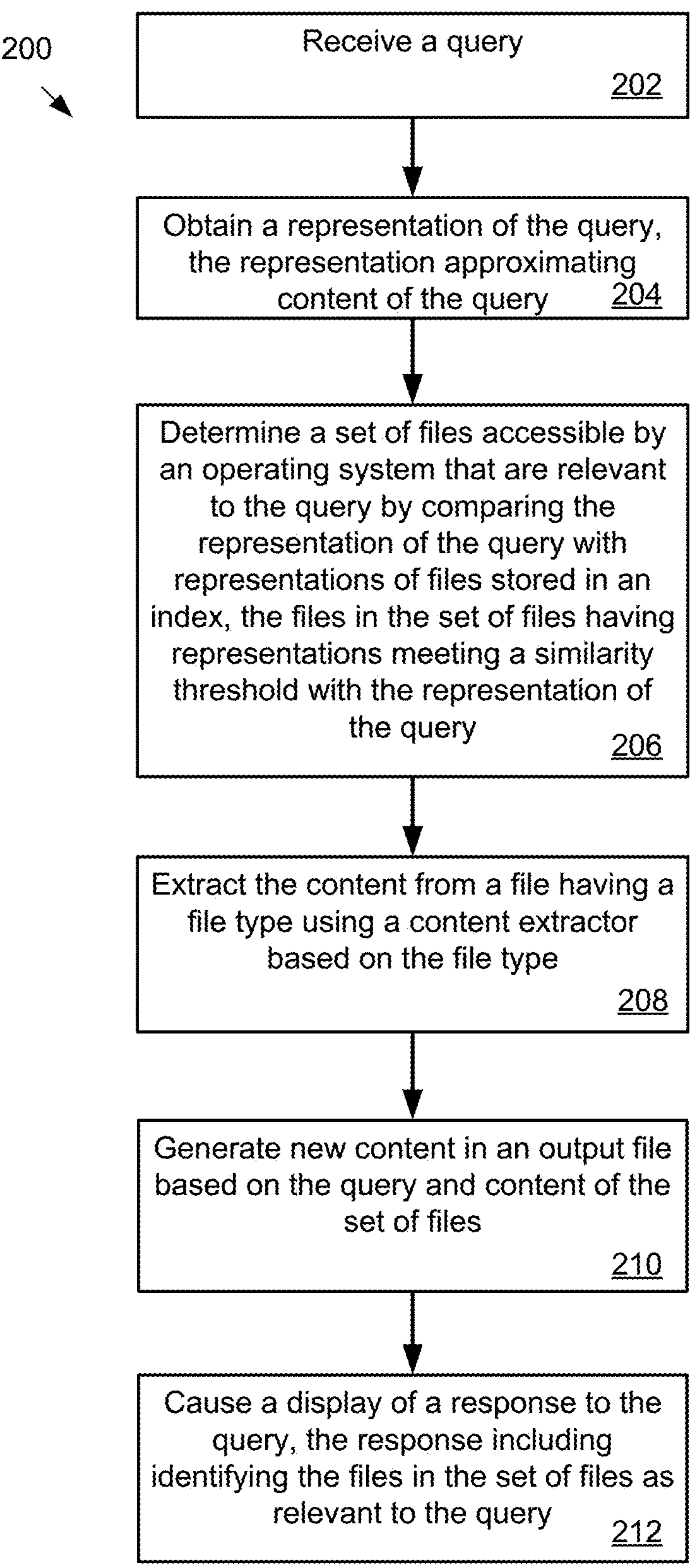
FIG. 2A illustrates a block diagram of an example method for responding to a query of a file system, according to an implementation.

FIG. 2A depicts method 200, in accordance with an implementation. Method 200 may be used to identify content or a file that is similar to a query. In implementations, the method 200 may include any combination of steps 202-212.

The method 200 may begin with step 202. In step 202, a query may be received. For example, a user may enter a query in the query box 110 and it may be received when the user presses Enter or selects the query initiation control 114.

The method 200 may continue with step 204. In step 204, a representation of the query may be obtained, the representation approximating content of the query. In some implementations, the representation may be an encoded query generated by using the query as input into a generative model and obtaining the embedding from the model.

The embeddings (e.g., an encoding) generated for the query are numerical representations that approximate the content of a resource. In implementations, a generative model may be used to generate the embeddings because such a model can efficiently capture semantic relationships, thus minimizing the memory resources utilized to provide the ability to recall previously visited resources based on the content of the resource rather than just the URL or title. Put another way, the embeddings provide a technical solution for surfacing previously visited resources based on the content of the resources within the memory constraints of a user device. The embeddings respect privacy because the embeddings are encoded representations of content stored only on the user device and are generated with user consent.

In implementations, content may be provided to a generative model which may use a decoder-only transformer architecture, and that performs language understanding and generation tasks. The generative model may take content as input and generate an embedding as output. The embedding is a vector representation of the passage, e.g., using a large set of numbers to capture the semantic information in the passage. In implementations, the generative model may be tuned or optimized for processing any specific type of content. This can be done by using training sets of targeted types of content. The generative model may operate on a server that does not store the content or any association between the content and a client device sending the content to the server.

The method 200 may continue with step 206. In step 206, a set of files accessible by an operating system may be determined to be relevant to the query by comparing the representation of the query with representations of files stored in an index, the files in the set of files having representations meeting a similarity threshold with the representation of the query.

The index includes representations of files, along with references for files. In implementations, the references include any combination of a file address or a URL. In implementations, the files may include any combination of content, information, metadata and/or formatting. In implementations, the content may include any information in a file that is not metadata. In implementations, the content may include information in the file that has semantic value.

In examples, the index may be saved to a user computing device. Or, with consent of the user, it may be saved on a server. Method 250 describes an implementation to generate an index below.

To determine which file(s) are more relevant to the query, a similarity (i.e., a similarity score) may be calculated between two embeddings, such as the embedded query and an embedding of a file's content. In examples, the similarity may be determined using a first cosine similarity, a measure of the angle between two vectors that represents whether two vectors are pointing in roughly the same direction. Other methods of measuring similarity between the encoded outline element and an encoded section of a document or an encoded summary of a section of a document may include: a Manhattan distance, a Euclidean distance, a Minkowski distance, and a Jaccard similarity, in addition to others.

The method 200 may continue with step 208. In step 208, the content may be extracted from a file having a file type using a content extractor based on the file type. In implementations, there may be more than one content extractor for different file types.

In implementations, a representation stored in the index may be associated with a cluster of files with similar semantic meaning. In response to identifying that the representation for the cluster of files is closest to the embedded query, a second determination may identify which file in the cluster is closest in meaning to the embedded query. By using a representation for a cluster of files, the method may incur fewer processing cycles to determine the most relevant file to the query more quickly.

The method 200 may continue with step 210. In step 210, new content may be generated in an output file based on the query and content of the set of files. In examples, the generative model used in association with step 204 may be the same or different from the one used in step 210.

The method 200 may continue with step 212. In step 212, a display of a response to the query may be caused to be displayed, the response identifying the files in the set of files as relevant to the query. In implementations, the response may be displayed on a user device, such as in FIthe query and response section 106 of the file search user interface 100.

Figure 2B:
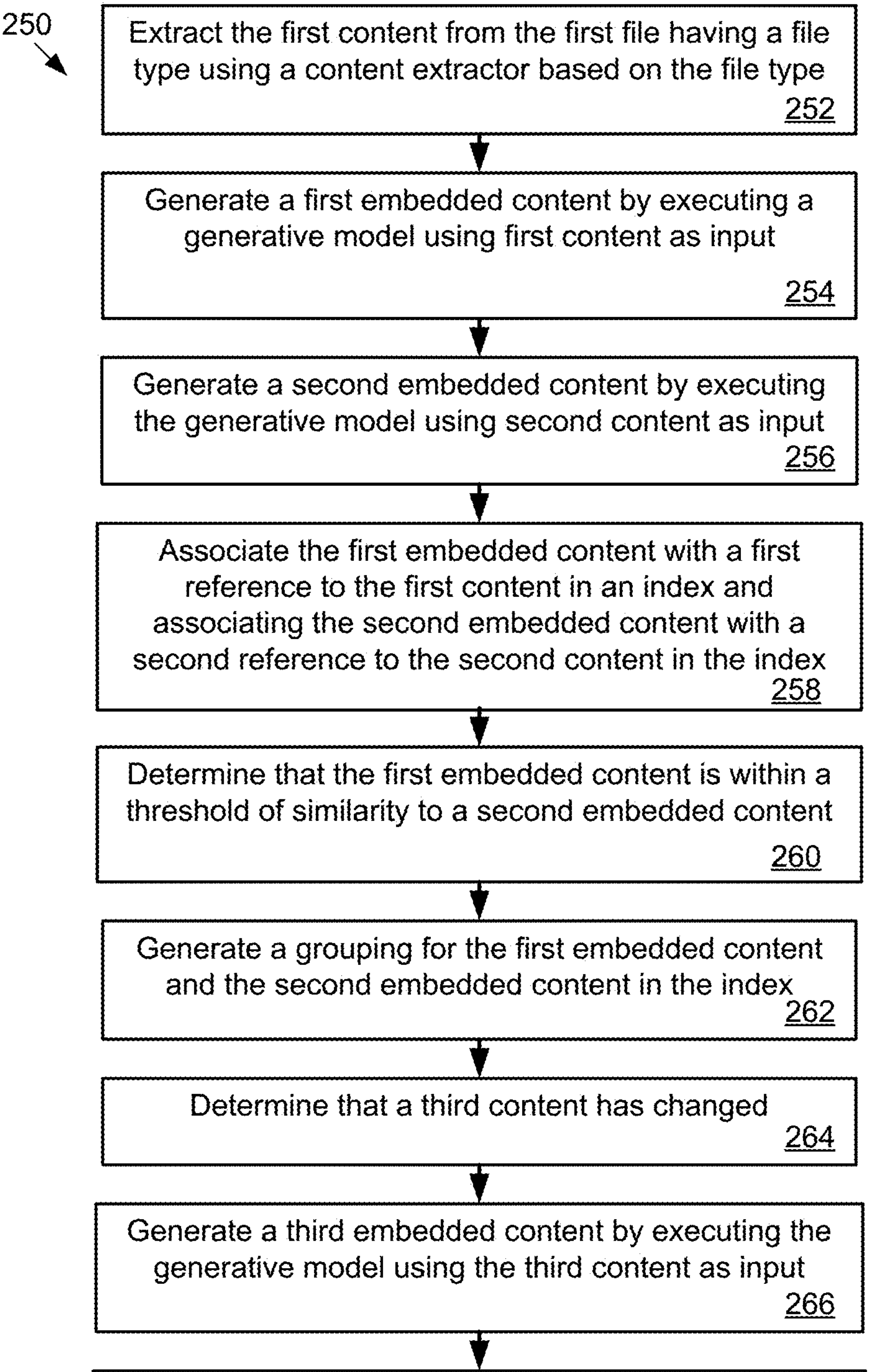
FIG. 2B illustrates a block diagram of an example method for generating an index to support a query of a file system, according to an implementation.

FIG. 2B depicts method 250, in accordance with an implementation. Method 250 may be used to generate an index which may be used to execute the method 200. In implementations, the method 200 may include any combination of steps 252-268.

Method 250 may begin with step 252. In step 252, the first content from the first file may be extracted having a file type using a content extractor based on the file type. This may be similar to step 208, as described above.

Method 250 may continue with step 254. In step 254, a first encoded content may be generated by executing a generative model using first content as input. This step may be similar to step 204, as described above.

Method 250 may continue with step 256. In step 256, a second encoded content may be generated by executing the generative model using second content as input. This step may be similar to step 204, as described above.

Method 250 may continue with step 258. In step 258, the first encoded content may be associated with a first reference to the first content in an index and the second encoded content may be associated with a second reference to the second content in the index. This may provide an index of embeddings that can be compared to a query to quickly identify content (via the first and second references) that is semantically related to the query.

Method 250 may continue with step 260. In step 260, it may be determined that the first encoded content is within a threshold of similarity to a second encoded content. In implementations, a similarity (i.e., similarity score) may be determined using any of the techniques describe with regards to step 206 above.

Method 250 may continue with step 262. In step 262, in response to determining that the first encoded content is within the threshold of similarity to the second encoded content, a grouping may be generated for the first encoded content and the second encoded content in the index. In implementations, the grouping may represent a cluster of related content. In implementations, grouping related content may allow for step 206 of method 200 to execute more quickly.

Method 250 may continue with step 264. In step 264, it may be determined that a third content has changed. For example, a user may have saved or modified a file on a user device or the cloud.

Method 250 may continue with step 266. In step 266, a third encoded content may be generated by executing the generative model using the third content as input. This step may be similar to step 204, as described above.

Method 250 may continue with step 268. In step 268, the third encoded content may be associated with a third reference to the third content in the index. This may allow for the index to be updated as new files are created or existing files are modified by a user.

Figure 3:
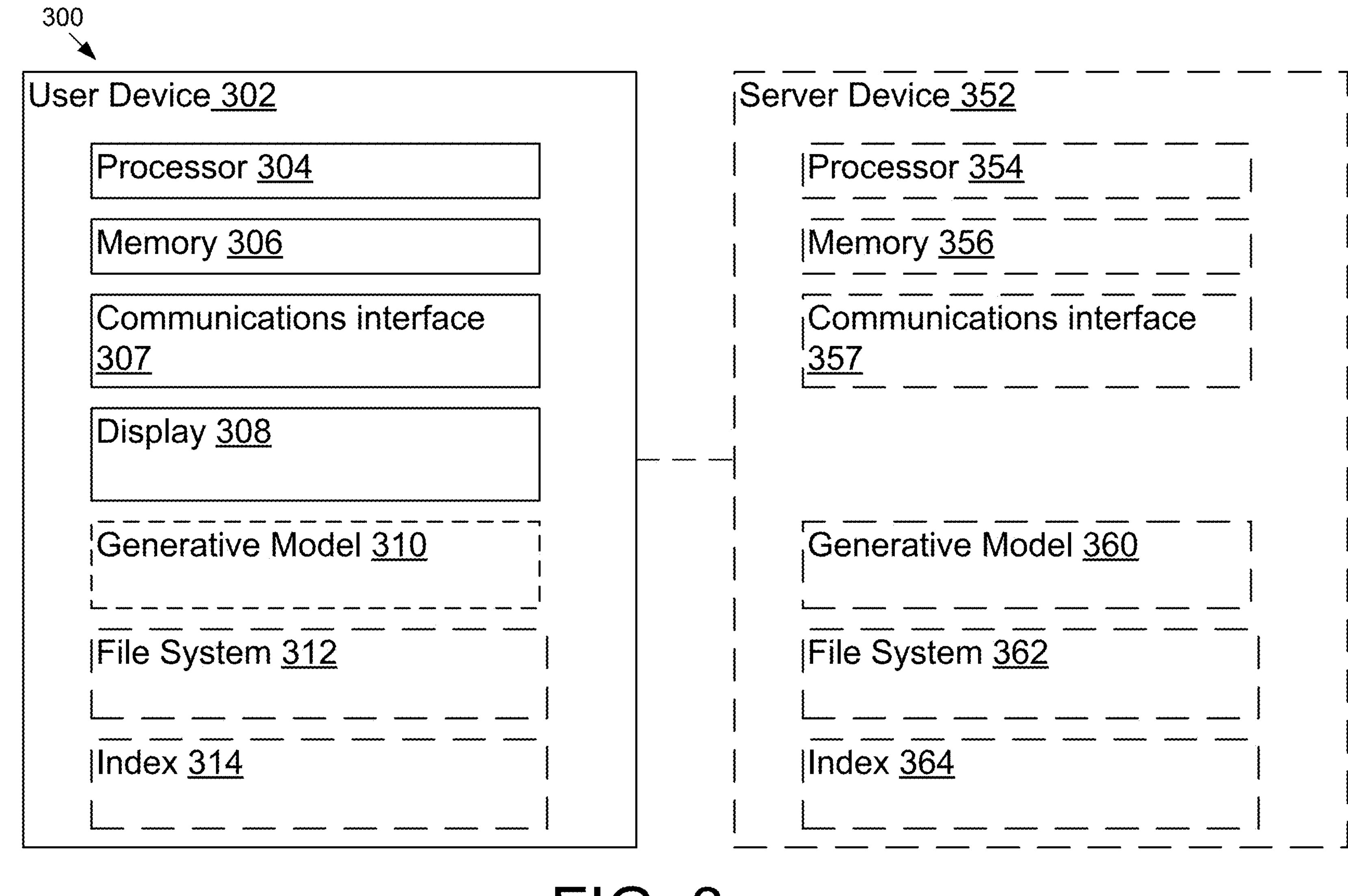
FIG. 3 illustrates an example block diagram of a computing device that includes an index to support a query of a file system.

FIG. 3 illustrates an example block diagram of a computing system 300 that includes an index to support a query of a file system. Computing system 300 includes a user device 302. User device 302 includes a processor 304, a memory 306, a communications interface 307, a display 308, and a file system 312. In implementations, user device 302 may further include a generative model 310 and/or an index 314.

In implementations, computing system 300 may further include a server device 350 in communication with user device 302. Server device 352 includes a processor 354, a memory 356, a communications interface 357, a display 358, and a file system 362. In implementations, server device 352 may further include a generative model 360 and/or an index 364. In examples, server device 350 may comprise more than one server device.

Processor 304 and/or processor 354 may be configured by instructions to execute any combination of methods 200 and 250. The instructions may include non-transitory computer readable instructions stored in, and recalled from, memory 306 and/or memory 356, respectively. In implementations, processor 304 and/or processor 354 may comprise more than one processing element or device and memory 306 and/or memory 356 may comprise more than one memory device.

Communications interface 307 and/or communications interface 357 may be operable to facilitate communication between user device 302 and server device 350 or another computing device. In examples, Communications interface 307 and/or communications interface 357 may utilize any wireless or wired communication methods.

Generative model 310 and/or generative model 360 may be used to generate a representation such as an embedding (e.g., an embedded query and/or embedded content), as is described above with regards to method 200 and method 250.

File system 312 may include one or more files saved on any combination of user device 302 and/or a server device (such as method 250). File system 362 may include files saved on the cloud.

Index 314 and/or index 364 may include representations (e.g., embeddings) of one or more files from file system 312 and/or file system 362.

On-Demand Generative Framework

Figure 4A:
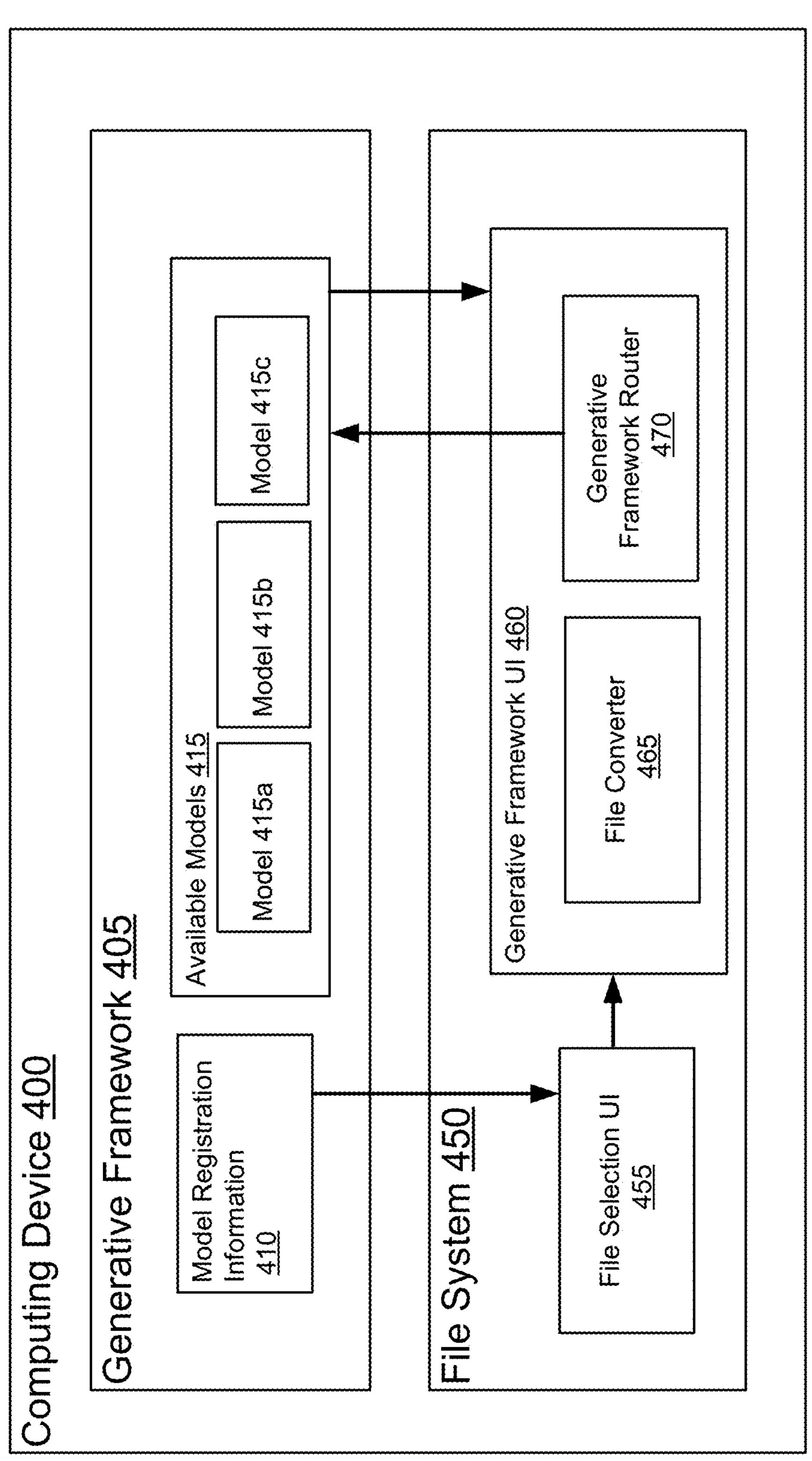
FIG. 4A illustrates an example block diagram of a computing device that includes an on-demand generative framework, according to an implementation.

FIG. 4A illustrates an example block diagram of a computing device 400 that includes an on-demand generative framework, according to an implementation. The computing device 400 can represent any one of a number of different computing devices, such as a desktop computer, a laptop computer, a tablet, a smartphone, a smart TV, smart wearable devices such as watches, AR glasses, or AR/VR goggles, etc. Thus, although not shown, the computing device 400 includes at least one processor (CPU, GPU, etc.) formed in a substrate that executes instructions to carry out operations. The operations are provided by other system components, such as an operating system, applications, input devices (such as a mouse, stylus, touch screen, trackpad, microphone, camera, etc.), output devices (such as a display (including touch screen display), printer, speakers, etc.), communication devices that enable the computing device 400 to communicate with other computing devices with or without a network (such as the Internet, a cellular network, a Wi-Fi network, etc.). The components, or portions of the components can be stored in one or more memories.

The computing device 400 includes a file system 450. The file system 450 can be part of an operating system. The file system 450 can be part of an application, e.g., that enables a user to locate, save, and open files of a particular type. The file system 450 includes a file-selection UI 455. The file-selection UI 455 is a graphical user interface that presents (e.g., displays) files and information about the files to the user. Conventionally, the file-selection UI 455 enables a user to select one or more files and perform one or more predetermined operations on the selected file(s). For example, the file-selection UI 455 may enable a user to rename, delete, open, move, copy, etc. one or more selected files. The file system 450 may have access to any combination of the following locations; local disk files, external hard disk files (e.g. USB drive, external hard drive), cloud files (e.g. files stored in a server under a user's account, the server being operated by a cloud storage providers). In some implementations, the file system 450 may restrict which files can be used in generating new content. The restriction may be based on file characteristics. Characteristics can include enterprise policies. For example, where the computing device 400 is a controlled device, e.g., subject to at least one enterprise policy, file system 450 may respect enterprise policies during selection of a file or files, e.g., either by the user or as part of a grouping, for use in generating a new output based on the selected files. Characteristics can include metadata for a file, such as the creator of a file, creation date, location (directory), digital rights management information, etc. For example, the file system 450 may allow the user to generate content based on files that the user created, based on the file's creation date or source metadata. As another example, the file system 450 may exclude files subject to digital rights management techniques from inclusion in selected input files. As another example, the file system 450 may exclude files stored in a location that disallows use for generative content from inclusion in selected input files. These examples are non-limiting and other characteristics of a file may be used to exclude certain files or certain file locations from selection as an input file used to dynamically generate new content (a new output file). By restricting which files can be used in generating new content, user privacy and/or security may be preserved.

Disclosed implementations also include a generative framework UI 460. The generative framework UI 460 works in conjunction with the file-selection UI 455 to provide a new operation that can be performed on selected files. In particular, the generative framework UI 460 enables a user to create new content based on the selected content, as disclosed herein.

In the example of FIG. 4A, the generative framework UI 460 may show the user generative options based on the models (e.g., model 415A, model 415B, model 415C) that are available in the generative framework 405. As illustrative examples, model 415A may be a PaLM2 model, model 415B may be an AudioLM model and model 415C may be an Imagen model. To be included in the generative framework 405, a model is first registered with the generative framework 405. The generative framework 405 may generate a list of generative models available in the framework. For example, once a model is registered with the generative framework 405, information about the model is stored in model registration 410. The information in model registration 410 can include what formats (e.g., PDF, DOCX, RTF, etc.) the model can take as input. File type is a category of file, e.g., spreadsheet, text document, image. File format is an embedding format for the type of file, e.g., JPEG, GIF for images, DOCX, RTF for text documents, XLS for spreadsheets, etc. It is understood that a file type generally refers to one or more file formats. A model can have a default file type and may use a default file format for the file type. These can be based on model registration, operating system settings, or file system settings. The information in model registration 410 can include which types of files (text documents, images, spreadsheets, etc.) the model accepts as input. For example, a first generative model may only accept GIF and JPEG image files whereas a second generative model may accept any text document and GIF image files. In some implementations, information in the model registration 410 may also include prompt input suggestions associated with the generative model. In some implementations, information for the model in model registration 410 may include prompt formatting requirements. Prompt formatting requirements, if provided, may be provided via a suggestion portion of a multi-file generative user interface, e.g., generative framework UI 460. The information in model registration 410 can include which types and/or formats of files the model can output, for example what output types/and or formats of files the model can output for a given input file type(s) and/or format(s). Once a model is registered with the generative framework 405 it can be used in generating new content based on multiple selected files. Although illustrated in FIG. 4A as part of the computing device 400, one or more of the models may be hosted by a service. In other words, one or more of the models (e.g., model 415A, model 415B, model 415C, etc.) can be remote from, but communicatively coupled with the generative framework 405 of computing device 400. In such implementations, the generative framework 405 may include API calls to the models, e.g., model 415A may represent an API call to a model. Hosting one or more of the models by a service remote from the computing device 400 may reduce the storage used on the computing device 400 and/or reduce the computational burden of the computing device 400.

In some implementations, the available models 415 may be provided by the administrator of the file system 450. The administrator of the file system 450 can be the enterprise that provides the operating system. The administrator of the file system 450 can be the enterprise that provides the application associated with the file system 450. In some implementations, one or more of the available models 415 may be provided by an organization not affiliated with the administrator of the file system 450, e.g., by a third-party. In such implementations, models may be available for registration in the generative framework 405 from an online source, such as a marketplace, an application store, an extension store, a website associated with the third-party, etc. In such an implementation, the user of the computing device 400 may select a model from the online source for registration in the generative framework 405 and inclusion in the available models 415. This may include downloading the model locally, so it is stored and executed at the computing device 400. As such, the availability of models 415 for use may be dynamically adjusted. In some implementations, the online source may enforce requirements for models offered via the online source, such as adherence to privacy, safety, and quality policies. In some implementations, this may include a review process for models offered through the online source.

Figure 6A:
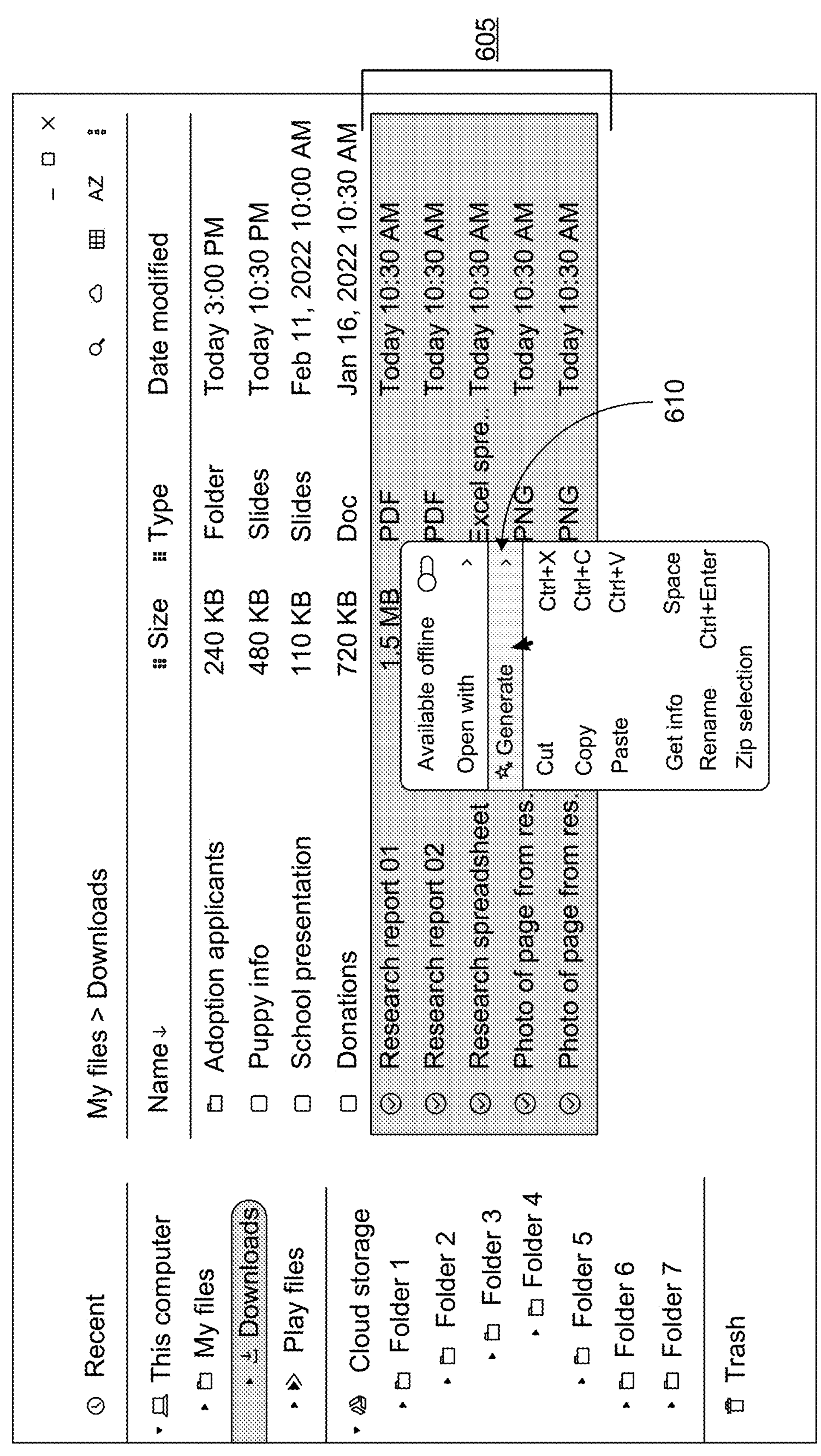
FIG. 6A and FIG. 6B illustrate example file-selection user interfaces.

In some implementations, the file-selection UI 455 may offer a selectable content generation option (e.g., a selectable control, such as a menu option, button, link, etc.) when a user has selected multiple files and the model registration 410 indicates that there is a model (or combination of models) in the file system 450 that can take all of the selected files as input (e.g., illustrated in FIG. 6A). In some implementations, the file-selection UI 455 may provide a file-collection user interface that includes a content generation option when a single file is selected, the file-collection interface allowing the user to select additional files to use in the content generation and providing the content generation option (e.g., illustrated in FIG. 6B). In any implementation, the content generation option may only be active (selectable) if the user has selected two or more files and there exists at least one model in the generative framework 405 that can process all of the selected files as input. If there is a model that can accept the selected files as input, the file system 450 may display the generative framework UI 460. The generative framework UI 460 displays generative content options, obtains user selections for the options, performs any necessary file conversions, and routes the request to the appropriate model in the available models 415. The model generates a new file based on the options and sends the new file back to the file system 450, which saves the new file. The new file (the output file) may be saved to a temporary storage location. The generative framework UI 460 may include functionality for viewing the new file, revising the generative content options, etc.

Figure 4B:
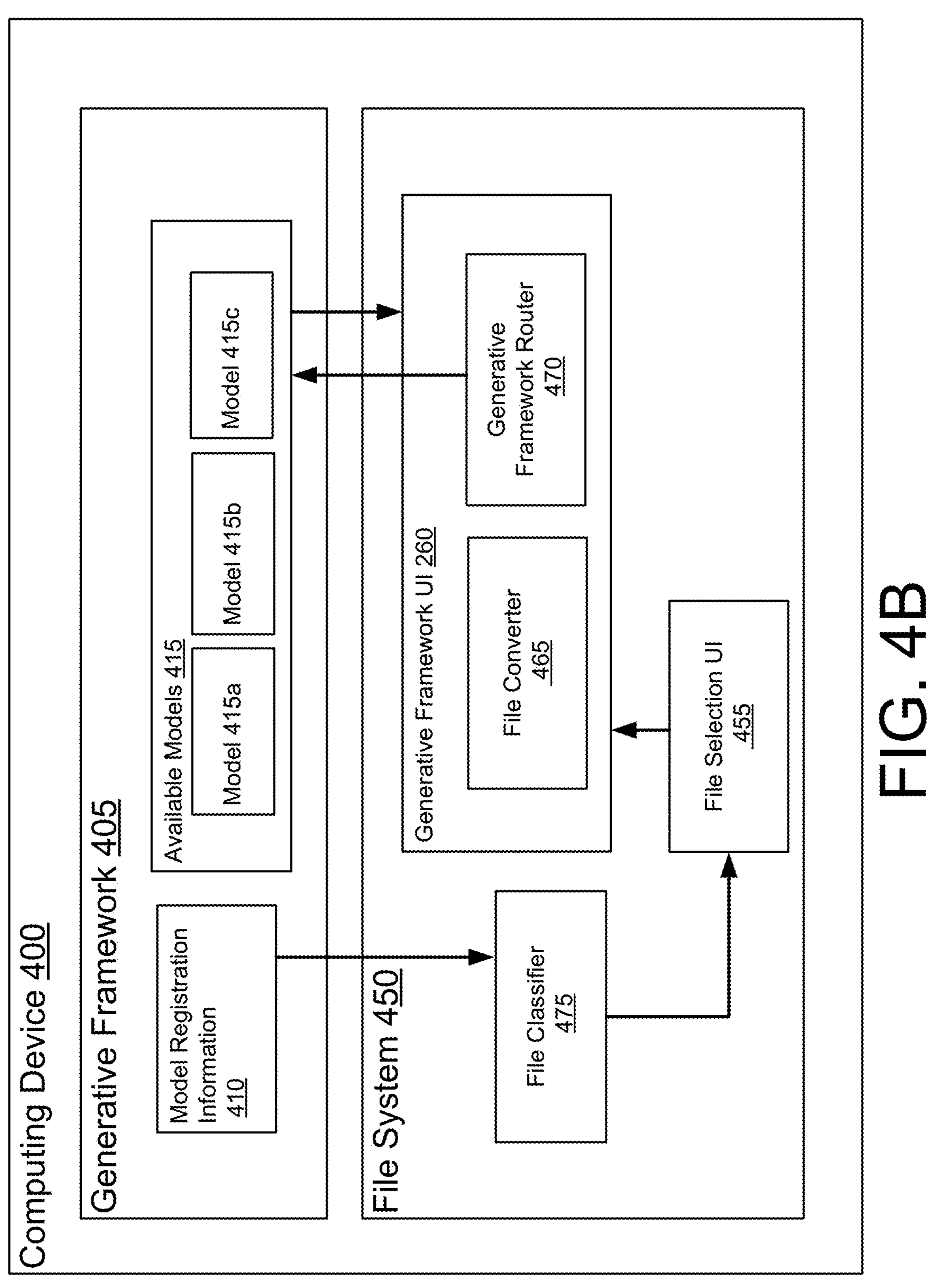
FIG. 4B illustrates an example block diagram of a computing device that includes a proactive generative framework, according to an implementation.

FIG. 4B illustrates an example block diagram of a computing device 400 that includes a proactive generative framework, according to an implementation. The computing device 400 of FIG. 4B is similar to the computing device of FIG. 4A and may be configured to perform method 500 and may generate any of the user interfaces described in FIGS. 6A to 6B. In addition, the file system 450 of the computing device 400 of FIG. 4B includes a file classifier 475. The file classifier 475 may be a background process that runs asynchronously to locate high affinity groupings of files. In other words, the file classifier 475 may periodically generate different groupings of the files accessible to the file system 450. The computing device 400 may use the groupings to proactively suggest generative content. As such, a user may be suggested generative content that the user may not otherwise have been aware was possible to generate without significant computational burden. The user may be able to generate new content with fewer inputs to the computing device 400, which may reduce the processing and energy demands of the computing device 400. Once an affinity grouping is identified, the file classifier 475 may associate the file identifiers of the files with the affinity grouping (e.g., an identifier for the affinity grouping) in a memory.

Figure 4C:
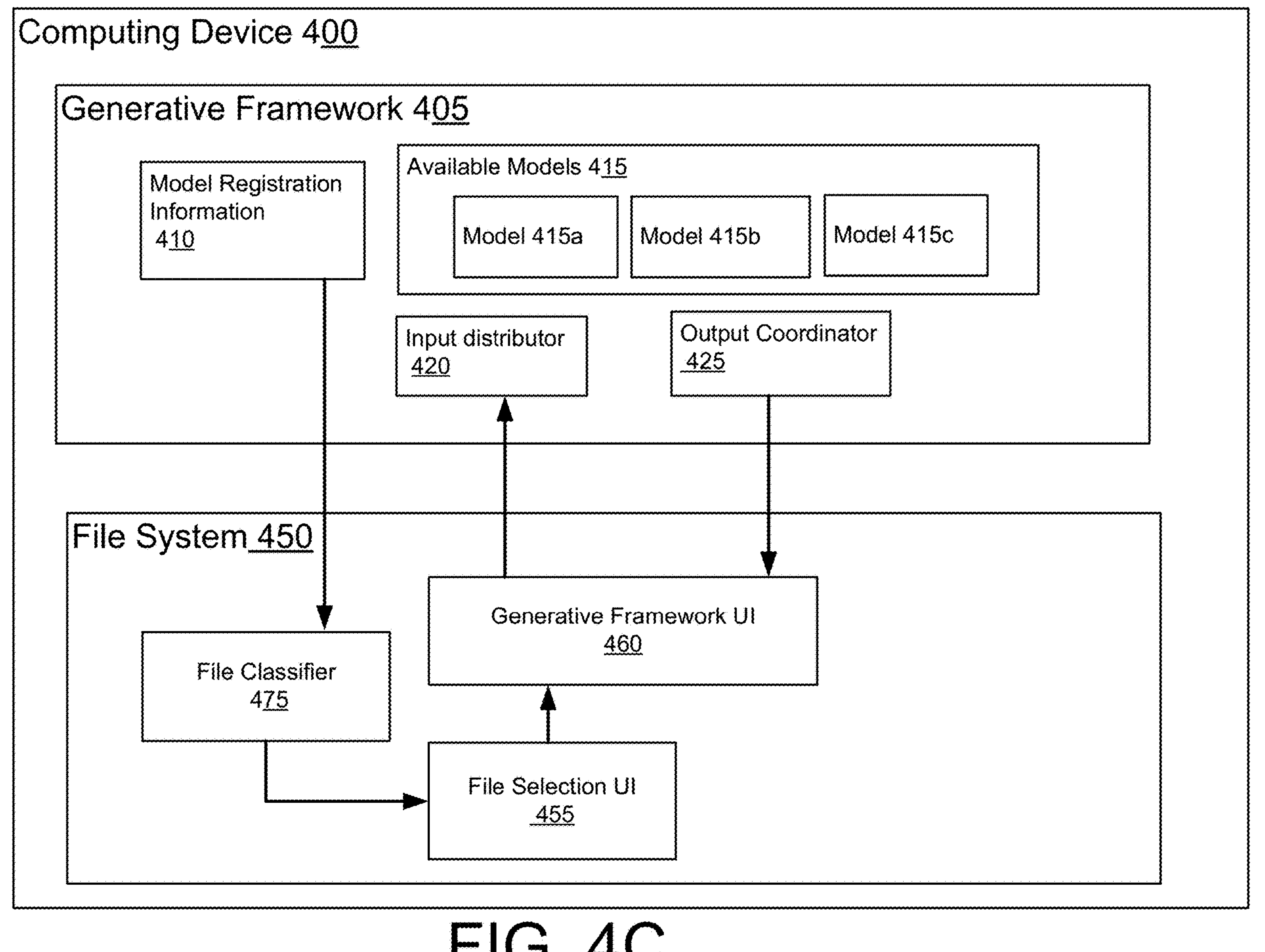
FIG. 4C illustrates an example block diagram of a computing device that includes a multimodal generative framework, according to an implementation.

FIG. 4C illustrates an example block diagram of a computing device 400 that includes a multimodal generative framework, according to an implementation. The computing device 400 of FIG. 4C is similar to the computing devices of FIGS. 4A and 4B, except that some of the functions of the generative framework UI 460, e.g., the generative framework router 470, are moved to the generative framework 405. In other words, the generative framework 405 of FIG. 4C takes on the role of file converter and router, which are handled by the file system 450 in FIGS. 4A and 4B, and also offloads from the file system 450 the running checks to see if a cohort of files (selection set of input files) is able to be handled by a single generative model in the available models 415. This means that the computing device 400 of FIG. 4C overcomes the restriction that all files in a selection set (all selected input files) must be able to be handled by a single model in the generative framework 405. In the example of FIG. 4C, the input distributor 420 of the generative framework 405 may be configured to determine if the combined output of multiple models can generate the requested output (e.g., output requested by a user). The input distributor 420 may also perform any needed file conversion. Because the output of multiple models may be obtained, the output coordinator 425 may be configured to compile the multiple outputs to create a single output file, e.g., in the requested output file format. The output coordinator 425 may also be configured to perform file conversions on the output file (or files), as needed. The output coordinator 425 may include safety checks on the final compiled output, etc. The configuration of the generative framework 405 and file system 450 of FIG. 4C may allow for the generation of output that leverages the generative capabilities of multiple models. As such, it may become possible to generate new content based on a wider variety of input file types and/formats, or combinations of disparate input file types and/formats. The range of outputs that can be generated based on any given combination of input files may be expanded. The configuration of the generative framework 405 and file system 450 of FIG. 4C may allow for improved flexibility in the generation of new content. The computing device 400 of FIG. 4C may be capable of performing method 500 but may additionally be capable of doing so regardless of whether one model exists in the generative framework 405 that accepts all selected file formats (e.g., operation 506 is not necessary). Similarly, the file classifier 475 of the file system 450 of FIG. 4C may group files regardless of the number of models needed to process the files in the group. Thus, an affinity grouping of files (file identifiers) may be associated with two or more models or may not be associated with any model and the input distributor 420 may determine how to distribute the selected input files to the available models 415. The configuration of the generative framework 405 and file system 450 of FIG. 4C can allow for more novel, complex, and potentially humorous output. For example, someone might want to create a short Claymation animation based on inspiration from a series of research documents, a written script, image prompts, and music.

In the examples of any of FIG. 4A, 4B, or 4C, a user may be provided with controls allowing the user to make an election as to both if and when the computing device 400 described herein may enable collection of user information, such as the files accessible to the generative framework UI 460 for use as input to the available models 415, and/or whether or not the generative framework UI 460 and/or the file classifier 475 is active. As an example, the user may be given control over what files and/or what file locations are accessible by the generative framework UI 460 and/or file classifier 475. As another example, users may be given information regarding the effect of downloading a file to a temporary file location for use as input to the available models 415, the effect of uploading a file to a model that is not local to the generative framework 405, etc., and may be given the opportunity to discontinue any of these operations. As another example, a user may use a setting to enable/disable the proactive generation of groupings, e.g., disabling or enabling file classifier 475. As such, privacy and/or security may be ensured.

Figure 6B:
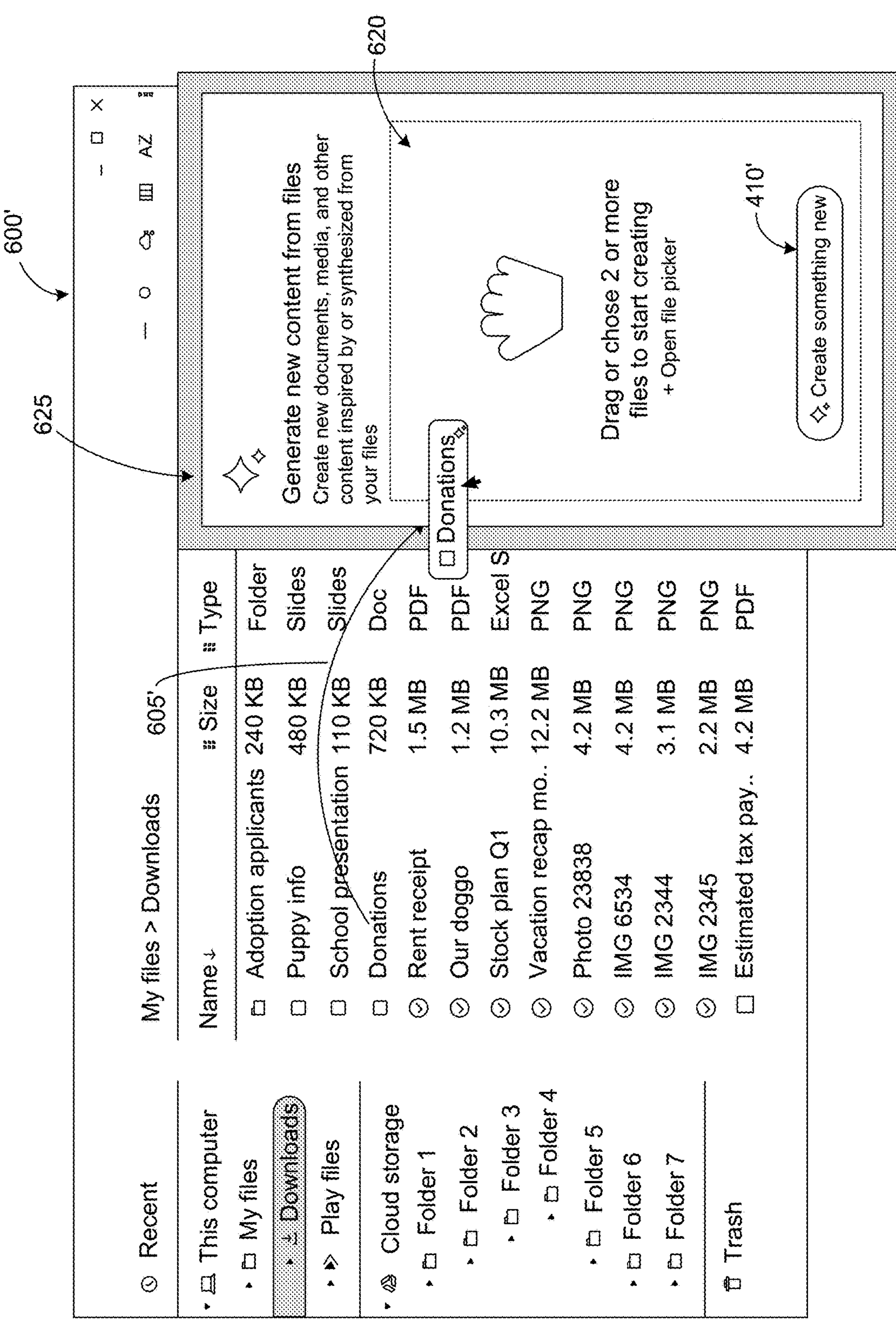

FIG. 5 illustrates an example flowchart of a method 500 for generating content from multiple files in a system, according to an implementation. The method 500 may be executed by a system, such as file system 450 of FIG. 4A, 4B or 4C. In the example of FIG. 5, at operation 502 the system receives a selection of two or more files, e.g., from a file-selection user interface such as file-selection UI 455 of FIG. 4A, 4B, or 4C. FIG. 6A and FIG. 6B illustrate example file-selection UIs 600 and 600' respectively. The selected two or more files are a set of files accessible to the file system 450. Once the user has selected multiple files (e.g., selected files 605 in FIG. 6A) the system may provide (e.g., display) an option (e.g., a selectable control, such as a menu option, button, link, etc.) for generating new content using the selected files, e.g., at operation 504. FIG. 6A illustrates an example content generation option 610 as part of a pop-up menu. In some implementations, illustrated in FIG. 6A, this content generation option may be part of a pop-up menu initiated by a user action, such as a right-click on the selected files (e.g., selected files 605 of FIG. 6A).

In some implementations, operation 504 can precede operation 502 or the operations may be performed concurrently. For example, the system may present a user interface for selecting multiple files for content generation, such as interface 625 illustrated in FIG. 6B, that includes the content generation option (e.g., content generation option 610' of FIG. 6B) and a file selection interface 620. In the example of FIG. 6B the user may drag-and-drop files into the file selection interface 620. Any files dropped (e.g., 605') into the file selection interface 620 may be considered selected files. In some implementations, display of the interface 625 may be initiated by user selection of a menu option, similar to option 610 of FIG. 6A. In some implementations, if the user has not selected multiple files, the option 410' may be inactive (i.e., un-selectable) and may not become active until at least two files have been added to the file selection interface 620.

At operation 506 the system determines whether the generative framework includes a generative model compatible with the files selected. In other words, the system determines whether the generative framework includes a generative model that can accept all of the selected files as input. Whether a model can accept the selected files as input depends on which types/formats of files are selected and whether this matches the types and/or formats indicated as acceptable in the model registration. In some implementations, the system may include a conversion process, e.g., file converter 465, which can convert a file format to another file format. For example, the system may be able to convert a PDF document to an editable text document (e.g., .DOC, .RTF, etc.). The system may take the available conversions into account in the determination of operation 506. In other words, if a selected file format is not accepted by a model as input, but the system includes a file converter that can convert the selected file format to a file format accepted by the model, the system may determine that the model accepts the selected file format. As such, a greater variety of file formats can be accepted for a given model.

If there is not a model that can take all files as input, at operation 508 the system may make the content generation option inactive. Making the content generation option inactive makes the option unelectable. In other words, the user may not be able to select the content generation option until the files selected can be used as input to one of the models. In some implementations, when the system is offline, the content generation option may also be inactive, regardless of whether a model exists in the generative framework that accepts the selected file types and formats. This may be appropriate where the computing device is communicatively connected to the model. In some implementations, rather than making the content generation option inactive, the system may show an error message in a generative user interface, such as generative framework user interface 700, that indicates no model is available. The error message may direct the user to change the selected files and try again. If there is at least one model in the generative framework that accepts the selected file types (including conversions of the selected file formats to another format), at operation 510 the system may make the content generation option active.

At operation 512 the system receives a selection of the content generation option (e.g., selection of the content generation option 610 or content generation option 610'). At operation 514 the system queries the model registrations (e.g., model registration 410) to determine what output formats are available from the model (or models) that accepts the selected file formats. In some implementations, the system may also query the model registrations to determine any prompt input suggestions. A prompt input suggestion may indicate a suggested prompt for input into the model. In some implementations, one or more prompt input suggestions may be dependent on the output type. In some implementations, operation 514 may include obtaining prompt formatting requirements, if they exist, for the model (or models) that accept the types of the selected files. One or more of the prompt formatting requirements may be dependent on the type of output selected. Accordingly, in some implementations the system may display prompt input suggestions and/or the prompt formatting requirements appropriate for the output file format selected by the user.

Figure 7:
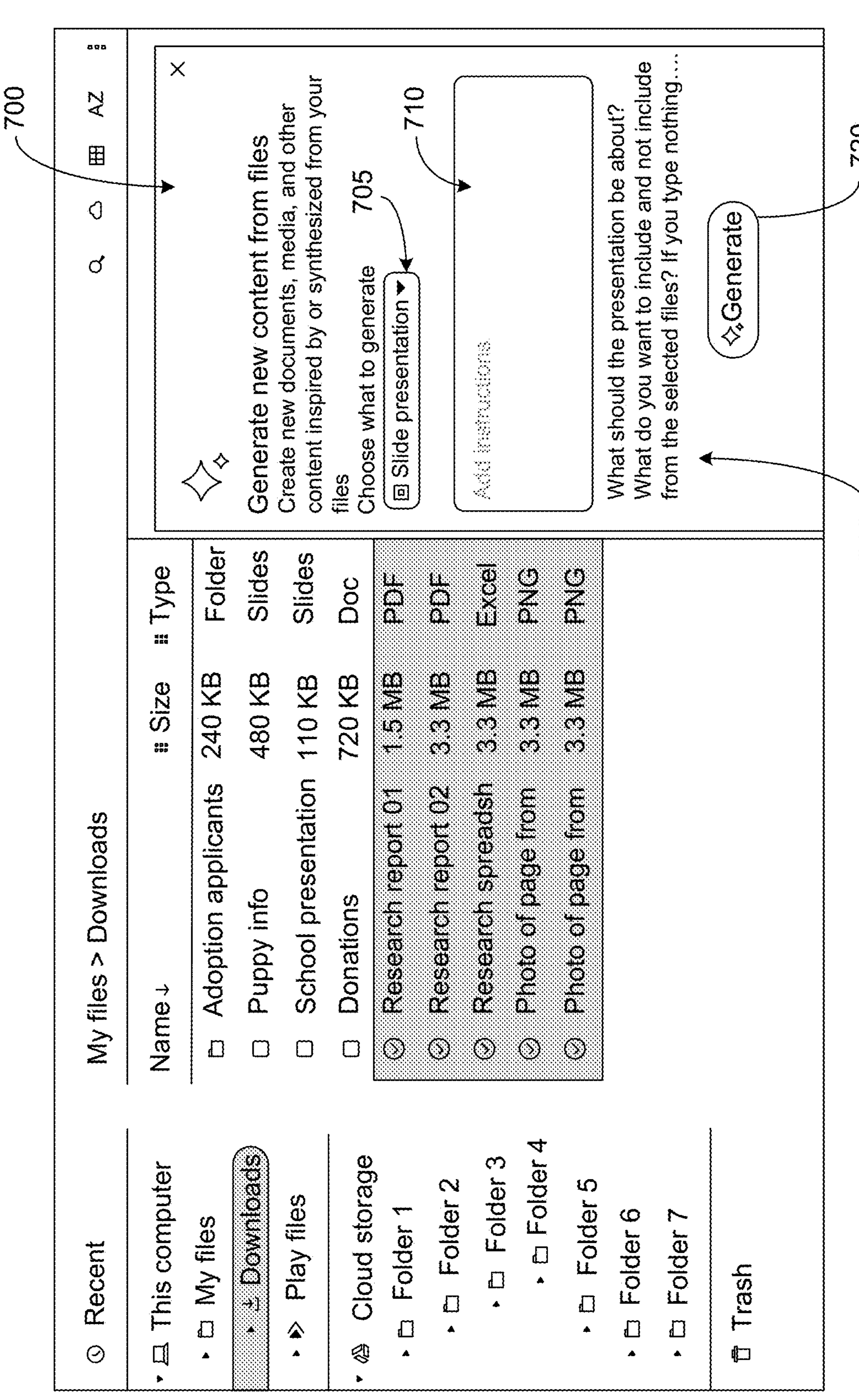
FIG. 7 illustrates an example generative framework user interface that displays the generative content options according to an implementation.

In response to receiving a selection of the content generation option, at operation 516 the system displays the generative content option(s). FIG. 7 illustrates an example generative framework user interface 700 that displays the generative content options. The generative framework user interface 700 may be displayed in response to selection of content generation option 610 or content generation option 610'. The generative framework user interface 700 includes an output control 705. The output control 705 is configured to provide the user with the ability to select an output type. The output types available for selection correspond to the output types returned from operation 514. There may be only one output type for selection, e.g., if only one model can accept the selected file formats and that model only provides one output file format (or type). The output control 705 may include a default output type. In other words, the output control 705 may have a default output type pre-selected, so that if the user does not choose an option from output control 705, the default output type is selected. The generative framework user interface 700 also includes a prompt input area 710. The prompt input area 710 is configured to receive a prompt from the user. The prompt describes instructions for the generative model for using the content of the selected files to generate the output. The generative framework user interface 700 also includes prompt formatting requirements 715. The prompt formatting requirements 715 are instructions that guide the user in generating the prompt provided in prompt input area 710. Not illustrated in FIG. 7, the generative framework user interface 700 can include controls representing suggested prompts. The suggested prompts represent prompts the model registration provides. Selection of a suggested prompt can populate prompt input area 710.

Figure 8:
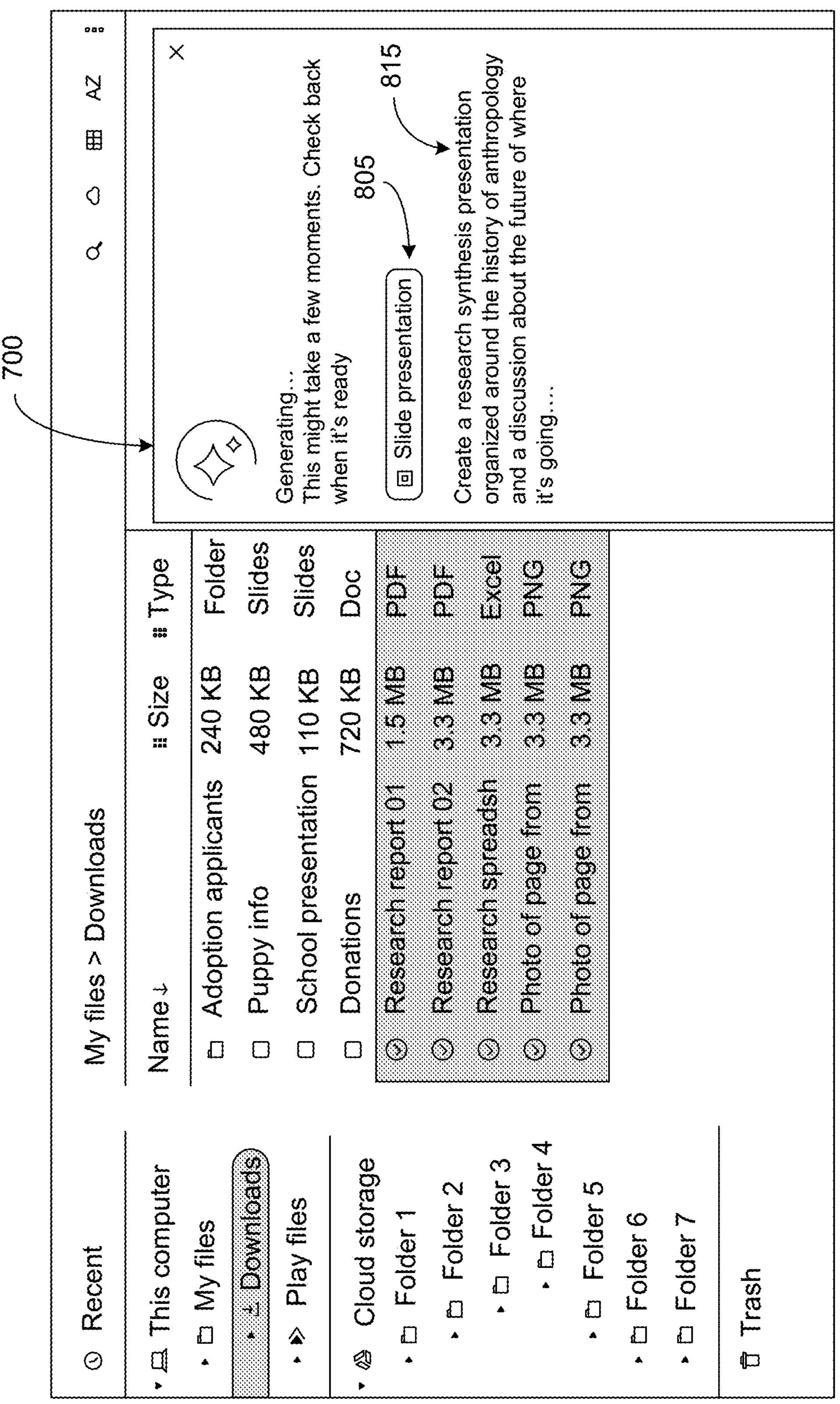
FIG. 8 illustrates an updated generative framework user interface according to an implementation.

At operation 518 the system obtains selection of the generative content options. The generative content options include at least a prompt and an output type. In one example, the system receives selection of the generative content options in response to the user selecting a control, such as submission control 720 of FIG. 7. In the example of FIG. 7, the submission control 720 may be active once a prompt and an output type have been selected. In response to receiving the selection of the generative content options, at operation 520 the system may perform any file conversion needed and route the prompt, output type, and input files (converted as necessary) to the model. In some implementations, the system may change the content of the generative framework user interface 700 while the model is processing the input. For example, FIG. 8 illustrates an updated generative framework user interface 700 with the prompt 815 and the output type 805 that were submitted to the model displayed (instead of as selectable controls).

At operation 522, the system receives the output file generated by the model and writes the output file to a memory in the client device. The memory may be a temporary storage location, e.g., a "downloads" directory or a "temporary" directory or cache memory. At operation 524 the system may generate a user interface that presents the output file to the user. Presenting the output file to the user can include presenting a control configured to, in response to selection, open the output file in a program associated with the format of the output file. Presenting the output file to the user can include providing a preview window displaying content of the output file. Operation 524 can also include providing a user interface with controls for one or more operations to perform on the output file. The operations can include revising the prompt and regenerating the output file. The operations can include saving the output file, e.g., to a location different from the temporary location. The operations can include discarding the output file. Discarding the output file deletes the output file from the temporary storage location.

Figure 9:
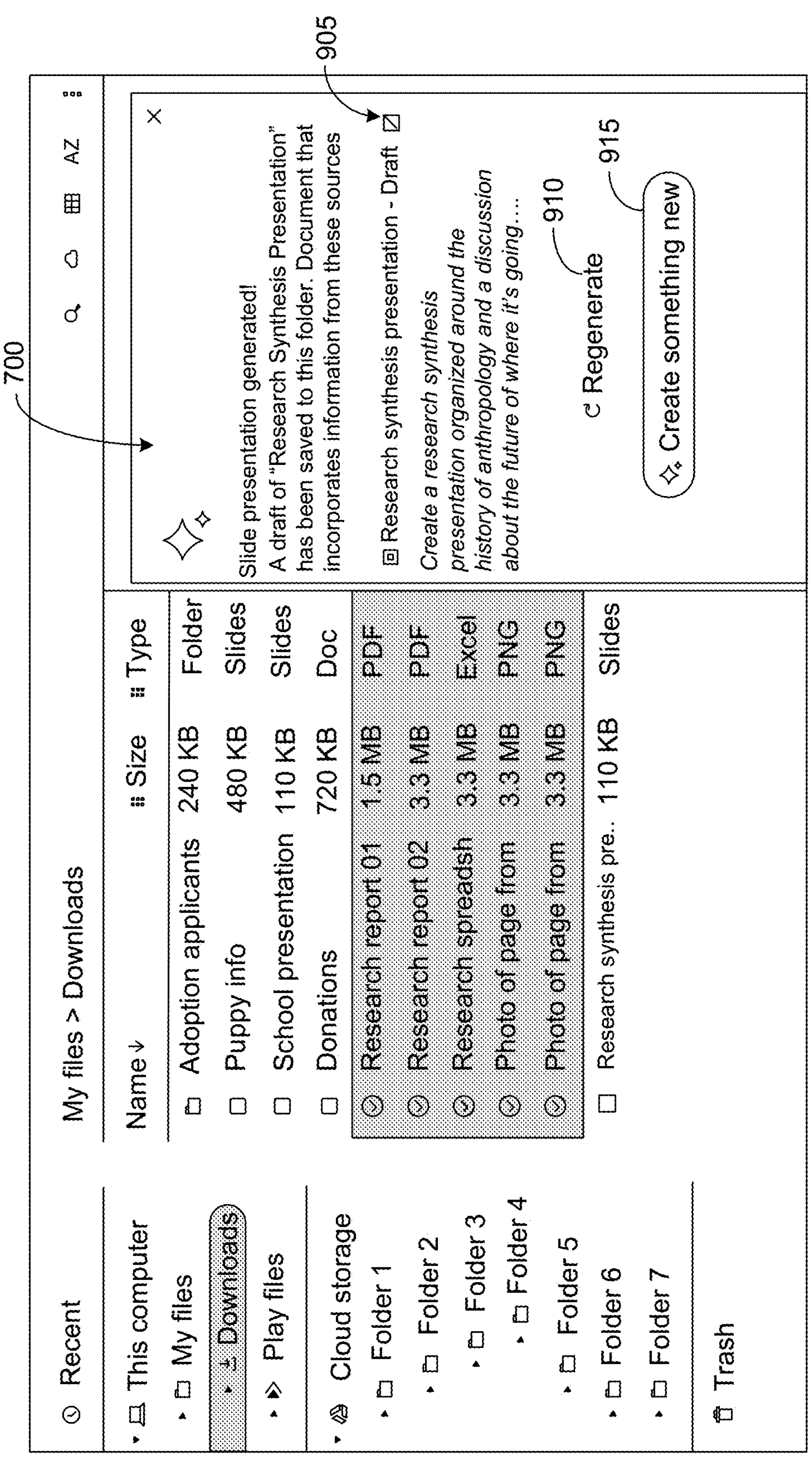
FIG. 9 illustrates an example generative framework user interface 700 that may be generated as part of operation 524.

FIG. 9 illustrates an example generative framework user interface 700 that may be generated as part of operation 524. The generative framework user interface 700 of FIG. 9 includes a control 905 for opening the output file, e.g., in an application for editing files of the output format. The generative framework user interface 700 of FIG. 9 also includes control 910 configured to regenerate the output file. Selection of control 910 may take the user back to an interface 700 for obtaining a prompt, such as the generative framework user interface 700 of FIG. 7. In such an implementation, the prompt input area 710 may be populated with the prompt used to generate the output file and the user may edit the prompt by changing the text entered into the prompt input area 710. In some implementations, selection of control 910 may submit the same prompt and input files to the model. Because the model is a generative model, submission of the same prompt may result in an output file with similar content. In such an implementation, the system may display an interface similar to FIG. 8 in response to selection of control 910. Selection of control 910 may cause the system to keep the same session with the model. In other words, the prior prompt and output file can be used as context for the regeneration of the output file.

The generative framework user interface 700 includes control 915 configured to start generation of a different output file, potentially using different selected files. For example, selection of control 915 may cause display of an interface similar to interface 625 of FIG. 6B. The file selection interface 620 may be empty, enabling the user to select new files, e.g., by drag-and-drop into the file selection interface 620. The file selection interface 620 may list the previously selected files and the user may drag new files in and/or drag files out of the file selection interface 620, thus changing the selected files for the new output file. In some implementations, selection of control 915 may take the user back to the file-selection user interface 600, e.g., as illustrated in FIG. 6A. Selection of control 915 may start a new session with the model. In other words, selection of control 915 may clear any context.

The interfaces of FIGS. 6A, 6B, and 7 to 9 are examples and implementations can use other interface configurations in conjunction with the method 500.

Proactive Generative Framework

FIG. 10 illustrates an example flowchart of a method 1000 for proactively suggesting generative content from multiple files in a system, according to an implementation. The method 1000 may be executed by a system, such as file system 450 of FIG. 4B or FIG. 4C. In the example of FIG. 10, at operation 1002 the system analyzes the files accessible via the file system and groups the files into affinity groupings based on the file content. The analysis may be done asynchronously with the remainder of method 1000. In other words, once files have been initially grouped (e.g., operation 1002 has been performed once), the grouping can be used in the remainder of method 1000. Operation 1002 may be performed again, independently of the remaining operations of method 1000. In some implementations, operation 1002 is performed periodically. In some implementations, operation 1002 can be performed in response to the addition of a new file to the file system. The grouping may use information such as file content, date added to system, file formats, and file titles to find groups with high affinity. For example, a number of photographs of receipts added in the year 2019 can have high affinity relative to financial document generation. Groupings may also be based on which file types (or formats) a model can take as input. In other words, each group may be associated with a model of the generative framework. In such an implementation, selection of the grouping is selection of a model from the generative framework.

At operation 1004, the system detects selection of at least one file in a file-selection user interface. In response to detection of at least one file, at operation 1006 the system may surface an option (e.g., a selectable control, such as a menu option, button, link, etc.) for generating new content using the selected file. Content generation option 1110 of FIG. 11, and content generation option 1410 of FIG. 14 illustrates examples of a content generation option. At operation 1008 the system receives a selection of the content generation option. In other words, the user has selected the content generation option, indicating intent to generate content from the grouped files of which the selected file is a member.

Figure 12:
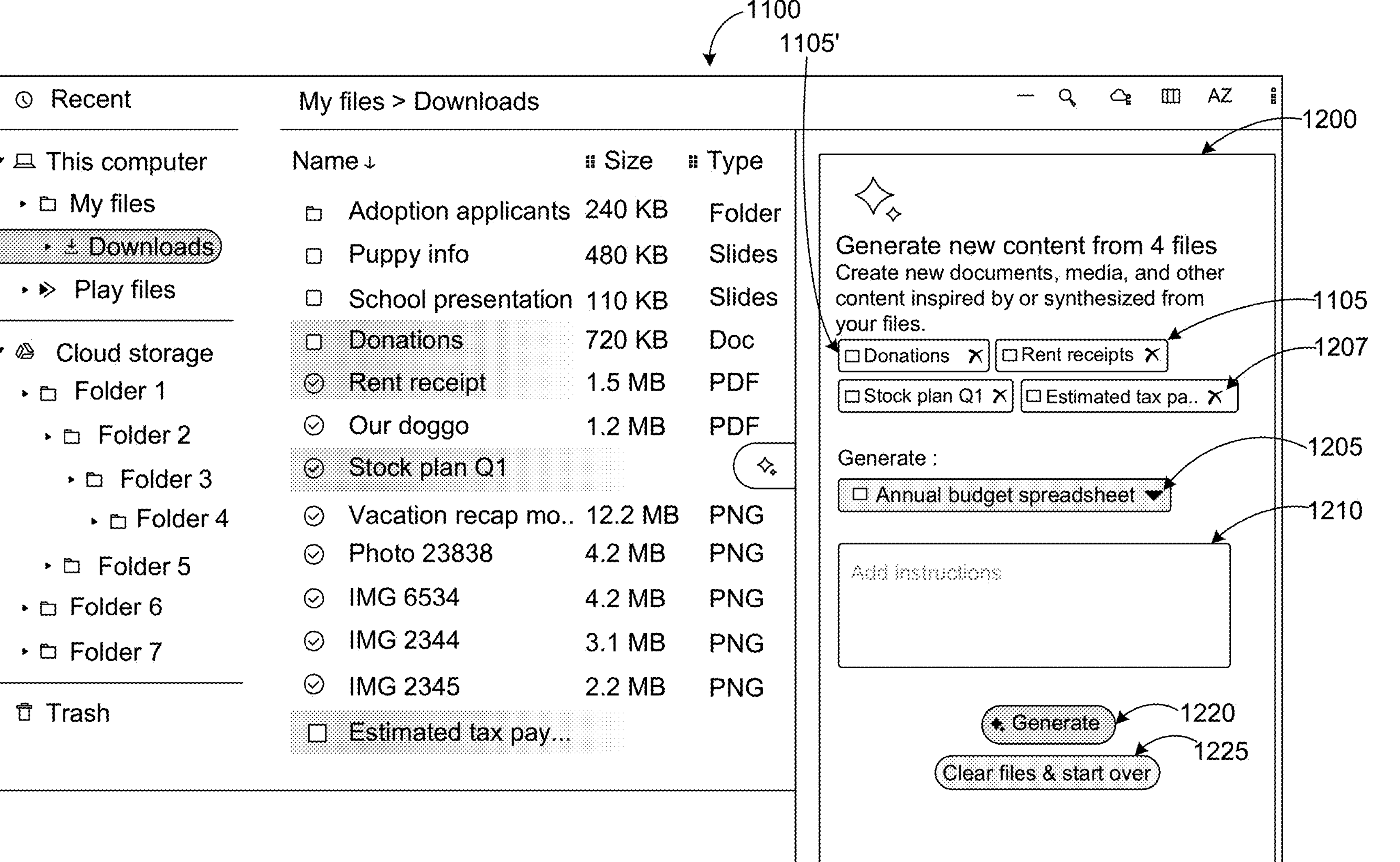
FIG. 12 illustrates an example user interface that displays generative content options and is configured to receive user selection of the options.

At operation 1010 the system queries the model registrations (e.g., model registration 410) to determine what generative content options are available and displays the content generative options to the user. The generative content options can include output types that are available from the model (or models) that is associated with the grouping(s) in which the selected file appears. In some implementations, the generative content options can include prompt input suggestions. In some implementations, the generative content options can include prompt formatting requirements, if they exist, for the model (or models) represented by the grouping(s) in which the selected file is included. Operation 1010 includes displaying the generative content options for selection by the user. One or more of the prompt formatting requirements may be dependent on the type of output selected. Accordingly, in some implementations the system may display prompt input suggestions and/or the prompt formatting requirements appropriate for the output file type or format selected by the user. In some implementations, default generative content options may be associated with the group. FIG. 12 illustrates an example user interface that displays generative content options and are configured to receive user selection of the options.

At operation 1012 the system obtains selection of the generative content options. The generative content options include at least a prompt and an output type. In one example, the system receives selection of the generative content options in response to the user selecting a control, such as submission control 1220 of FIG. 12. In the example of FIG. 12, the submission control 1220 may be active once a prompt and an output type have been selected. In response to receiving the selection of the generative content options, at operation 1014 the system may perform any file conversion needed and route the prompt, output type, and input files (converted as necessary) to the model. In some implementations, the system may change the content of the generative framework user interface 700 while the model is processing the input, e.g., similar to FIG. 8.

At operation 1016, the system receives the output file generated by the model and writes the output file to a memory in the client device. The memory may be a temporary storage location, e.g., a "downloads" directory or a "temporary" directory or cache memory. At operation 1018 the system may generate a user interface that presents the output file to the user. Presenting the output file to the user can include presenting a control configured to, in response to selection, open the output file in a program associated with the format of the output file. Presenting the output file to the user can include providing a preview window displaying content of the output file. Operation 1018 can also include providing a user interface with controls for one or more operations to perform on the output file. The operations can include revising the prompt and regenerating the output file. The operations can include saving the output file, e.g., to a location different from the temporary location. The operations can include discarding the output file. Discarding the output file deletes the output file from the temporary storage location. The prior grouping of files may lead to the user being able to generate new content with fewer inputs than otherwise would have been necessary (e.g. fewer user selections of individual files to be input), which may reduce processing and power consumption of the system, and which may streamline the generation of new content for a user.

Figure 11:
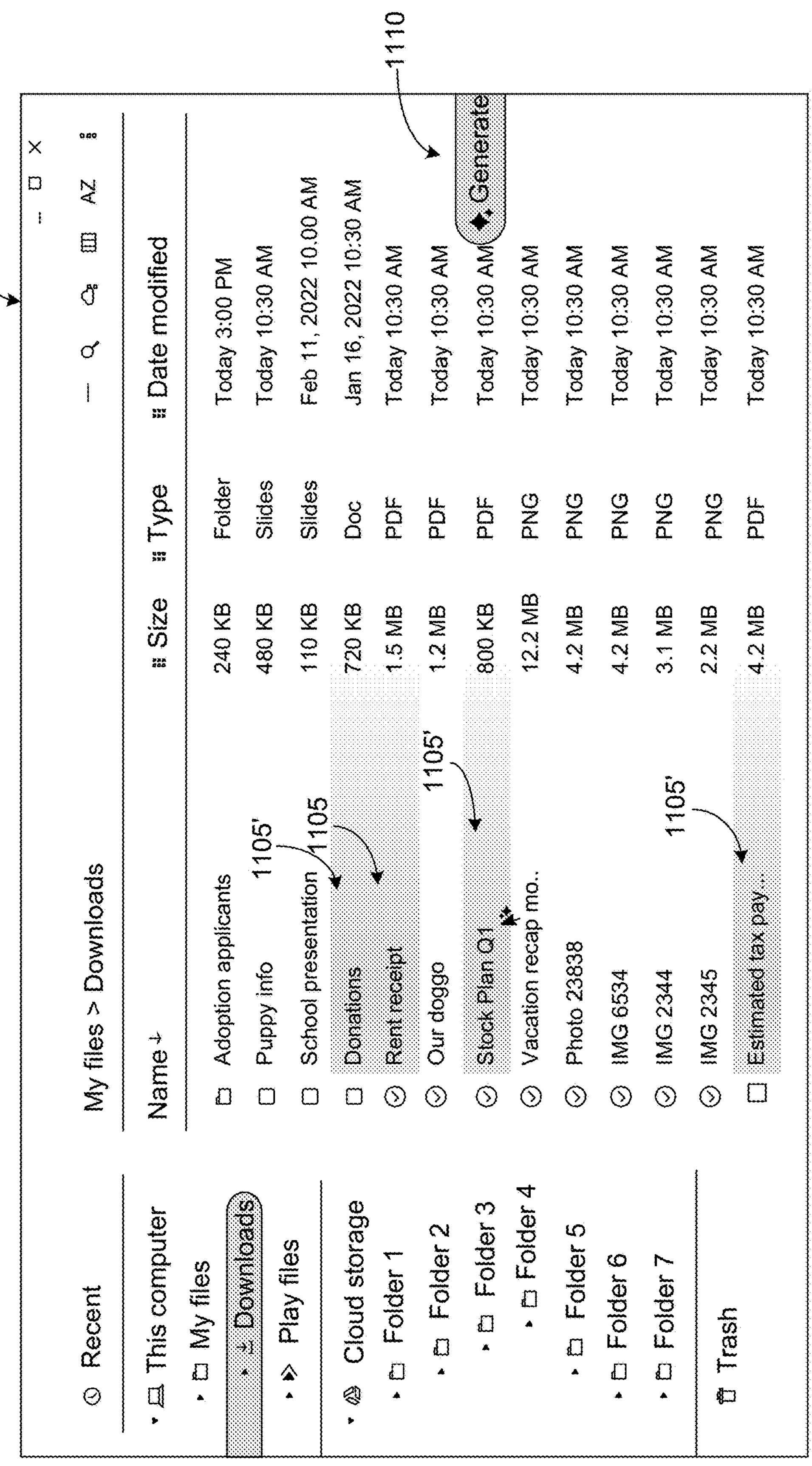
FIG. 11 illustrates an example file-selection user interface in which proactive content generation is suggested.

FIG. 11 illustrates an example file-selection user interface 1100 in which proactive content generation is suggested. In the example of FIG. 11, the user has selected file 1105, named "Rent receipt". File selection can be accomplished by express selection (e.g., the user clicks on/taps the file name in the file-selection user interface 1100). File selection can be accomplished by implicit selection, such as a hover event. For example, a user may select a file by hovering an input device (e.g., a mouse cursor, a finger, a stylus) over a file. In response to the selection, the system may determine that file is part of a grouping of files associated with a generative model. In the example of FIG. 11, the system may surface the content generation option 1110 in response to determining that the selected file is part of a grouping of files. In some implementations, the system may also provide an indication of the other files 1105' that are in the group along with the content generation option 1110. In the example of FIG. 11, the other files 1105' in the group (an affinity group) are identified (e.g., by file identifier) along with the selected file 1105. Identification of the selected file and the other files in the group may be accomplished by changing an appearance of the file name in the file-selection user interface 1100, e.g., by highlighting (shown in FIG. 11), bolding, italicizing, etc. As such, a user a user may be made aware of which particular files may together be used as input to one or more models to generate a viable or useful new output.

FIG. 12 illustrates an example generative framework user interface 1200 initiated by selection of a content generation option, e.g., content generation option 1110 of FIG. 11. In the example generative framework user interface 1200 of FIG. 12, the files in the group (selected files 1105) are displayed. In some implementations the user can remove one or more files from the group, e.g., using control 1207. The generative framework user interface 1200 includes an output control 1205. The output control 1205 is configured to provide the user with the ability to select an output file type (or file format). The output file types (and/or file formats) available for selection correspond to the output types associated with the model, e.g., the output types returned from operation 1008. There may be only one output type for selection, e.g., if the model associated with the group of files only provides one output file type or file format. The output control 1205 may include a default output type. In other words, the output control 1205 may have a default output type pre-selected, so that if the user does not choose an option from output control 1205, the default output type is selected. The generative framework user interface 1200 also includes a prompt input area 1210. The prompt input area 1210 is configured to receive a prompt from the user. In some implementations, the group is associated with a default prompt and the prompt input area 1210 can be used to add additional prompt instructions. In such implementations, input into the prompt input area 1210 may be optional. In some implementations, there is no default prompt for the group. In such implementations, input from the user for the prompt input area 1210 may still be optional, which results in the model deciding how to combine the content of the files.

The generative framework user interface 1200 can include submission control 1220. The submission control 1220 may be configured to initiate any file conversions needed and send the generative content options and the input files (e.g., the files in the group that were not removed via control 1207) to the model. Put another way, the submission control 1220 may be configured to, in response to selection, initiate operation 1014 of FIG. 10. The generative framework user interface 1200 can also include a basic model control 1225.

The basic model control 1225 may be configured to initiate a generative user interface that enables the user to select files manually, e.g., such as file-selection user interface 600' of FIG. 6B. The generative framework user interface 1200 may also include prompt formatting requirements (not shown). Also not illustrated in FIG. 12, the generative framework user interface 1200 can include controls representing suggested prompts. The suggested prompts represent prompts the model registration provides. Selection of a suggested prompt can populate prompt input area 1210.

Figure 13:
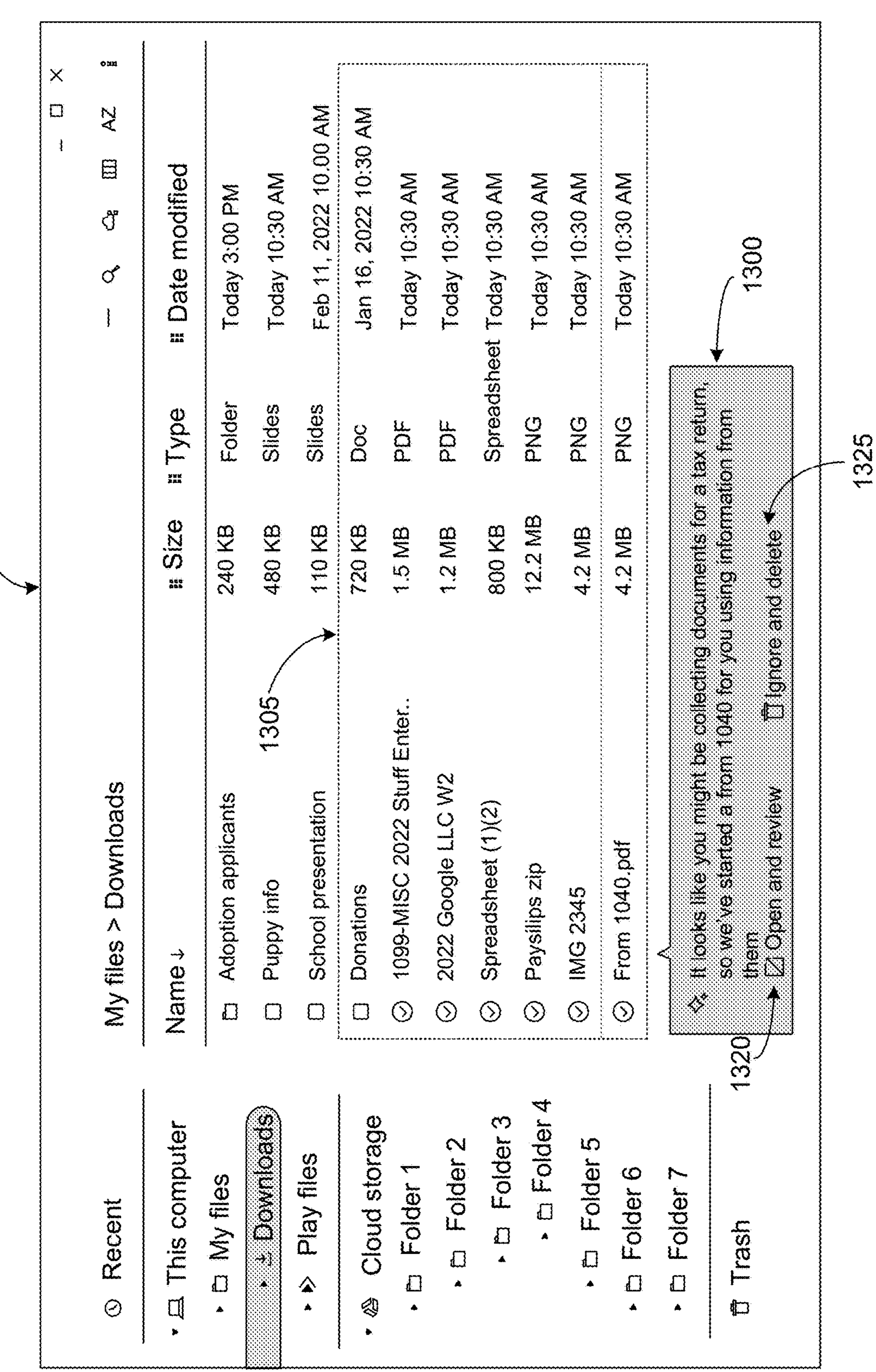
FIG. 13 illustrates an example generative framework user interface in which proactive content generation is suggested.

FIG. 13 illustrates an example generative framework user interface 1300 in which proactive content generation is suggested. In the example of FIG. 13, the system has proactively selected files in an affinity group, submitted the files to the model associated with the group (selected files 1305) using a default prompt and output file format, and received the new file. In other words, some implementations may perform operations 1014, 1016, and 1018 using defaults for files in an affinity group that includes a file selected by the user. The selection can be explicit or implicit, as discussed with regard to FIG. 11. The selection can also be implicit by display of a certain number of the files in the file-selection user interface 1100. For example, in the example of FIG. 13 the selected files 1305 are files in an affinity group related to a tax return. If some percentage of these files, e.g., half, three-quarters, etc.) are displayed in the file-selection user interface 1100 the system may proactively perform operations 1014 to 1018 using the selected files 1305.

In the example of FIG. 13, the system generates generative framework user interface 1300 after receiving the generated output file from the model. The generative framework user interface 1300 may include a review control 1320 for opening the generated file (the output file) in an application associated with the output file format. The generative framework user interface 1300 may also include a cancel control 1325. The cancel control 1325 may be configured to delete the output file from the temporary storage location and close the generative framework user interface 1300. The proactive generation of the output file may occur with prior user consent. For example, such automatic submission may be selected by a user in a setting of the file system.

FIG. 14 illustrates an example file-selection user interface 1100 in which proactive content generation is suggested. In the example of FIG. 14, the user has selected file 1405, named "Donations". File selection can be accomplished by express selection (e.g., the user clicks on/taps the file name in the file-selection user interface 1100). File selection can be accomplished by implicit selection, e.g., a user may select a file by a hover event (hovering an input device, such as a mouse cursor, a finger, a stylus, etc., over a file). In response to the selection, the system may determine that file is part of one or more groupings of files associated with a generative model and/or that the model can generate two or more outputs from the files (e.g., different suggested prompts, different outputs). In the example of FIG. 14, the system may surface the content generation option 1410 in response to determining that the selected file is part of a grouping of files with various options for what can be generated.

Figure 15:
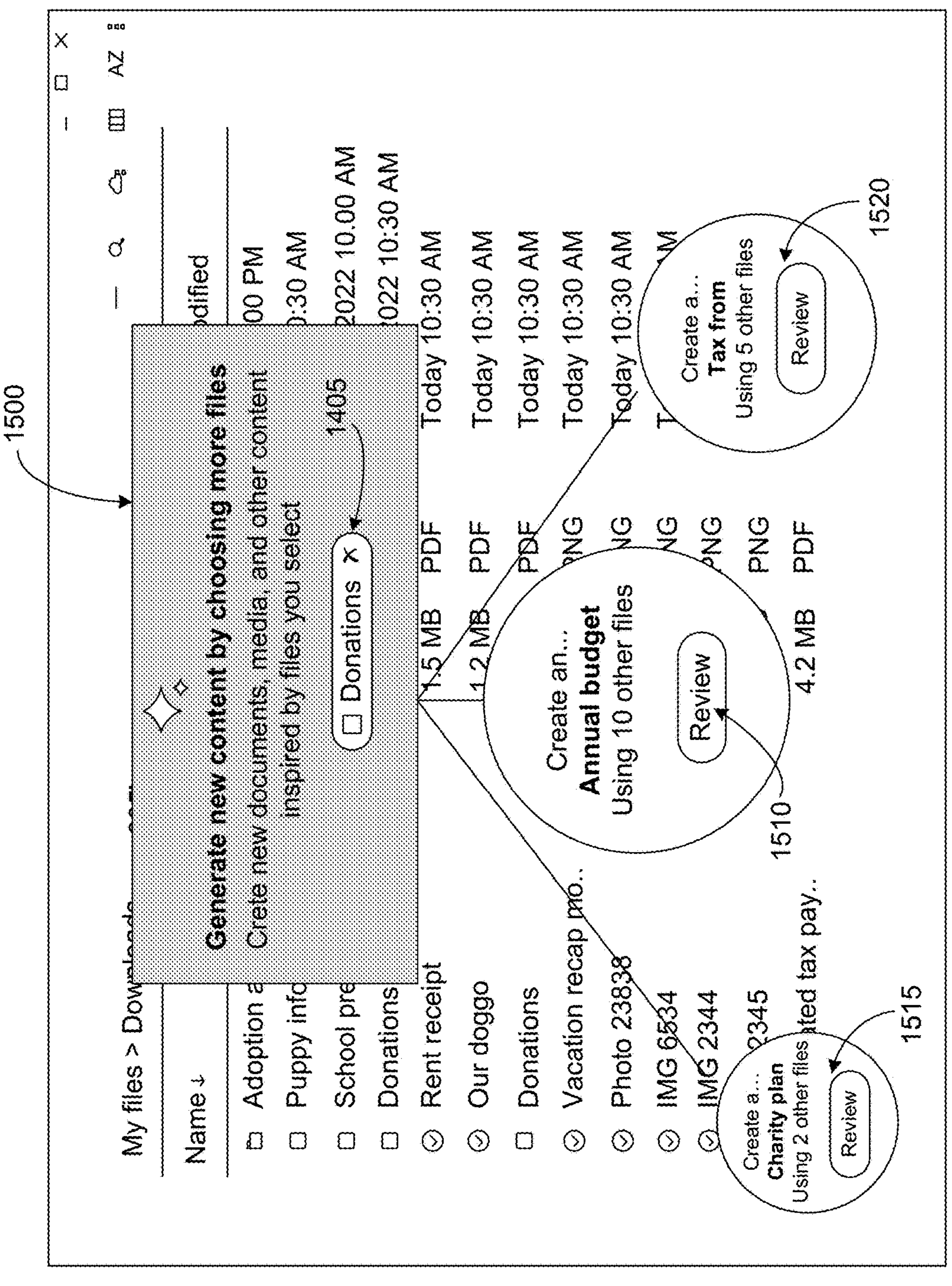
FIG. 15 illustrates an example generative framework user interface initiated by selection of a content generation option, according to an implementation.

FIG. 15 illustrates an example generative framework user interface 1500 initiated by selection of a content generation option, e.g., content generation option 1410 of FIG. 14. In the example of FIG. 15, the generative framework user interface 1500 includes an indication of the selected file 1405 and three suggestions for generative content. Three suggestions is an example only and implementations can include one or more suggested generated output files. The suggestions can be based on the group(s) the selected file 1405 is a member of. The suggestions, e.g., suggestion 1510, suggestion 1515, suggestion 1520, can be based on suggested prompts for the model (or models) associated with the group (or groups) the selected file 1405 is a member of. In some implementations, the user interface 1500 may provide an indication of predicted reliability of the generated output file. For example, a size of a user element for the suggestion (e.g., the circles in FIG. 15) may correspond to predicted reliability. As another example (not illustrated in FIG. 15), a color of the user element for the suggestion may provide an indication of predicted reliability. As another example, an appearance of the text used in the user element for the suggestion may provide an indication of predicted reliability. The predicted reliability may be based on data provided by the generative model or models used to generate the output file. The predicted reliability may be based on the number of files in the group and/or attributes of the files in the group. For example, an output based on more files may be considered more reliable and/or reliability may be based on a coherence measurement for the files in the group.

Each suggestion for generative content (e.g., suggestion 1510, suggestion 1515, suggestion 1520, etc.) may include a brief description of the type of content to be generated. This can be based on a suggested prompt associated with the group and/or the model. The suggestion can include an indication of the number of other files in the group, as illustrated in FIG. 15. The suggestion can include an indication of the files in the group (not illustrated in FIG. 15). The suggestion can include a review control. The review control may be configured to, in response to selection by the user, submit a default prompt and the files in the group to the model associated with the group. In other words, the review control may be configured to perform operations 1014 to 1018 in response to selection using default generative content options. The review control may be configured to, in response to selection by the user, initiate display of a generative framework user interface that enables the user to modify/edit the generative content options. For example, selection of a review control may initiate display of generative framework user interface 1200 of FIG. 12. The review control may be similar to generative framework user interface 1300 of FIG. 13 and include controls similar to review control 1320 and cancel control 1325. In such an implementation the system may have automatically generated the output, similar to FIG. 13.

The interfaces of FIGS. 11 to 15 are examples and implementations can use other interface configurations in conjunction with the method 1000.

Multimodal Generative Framework

Figure 16:
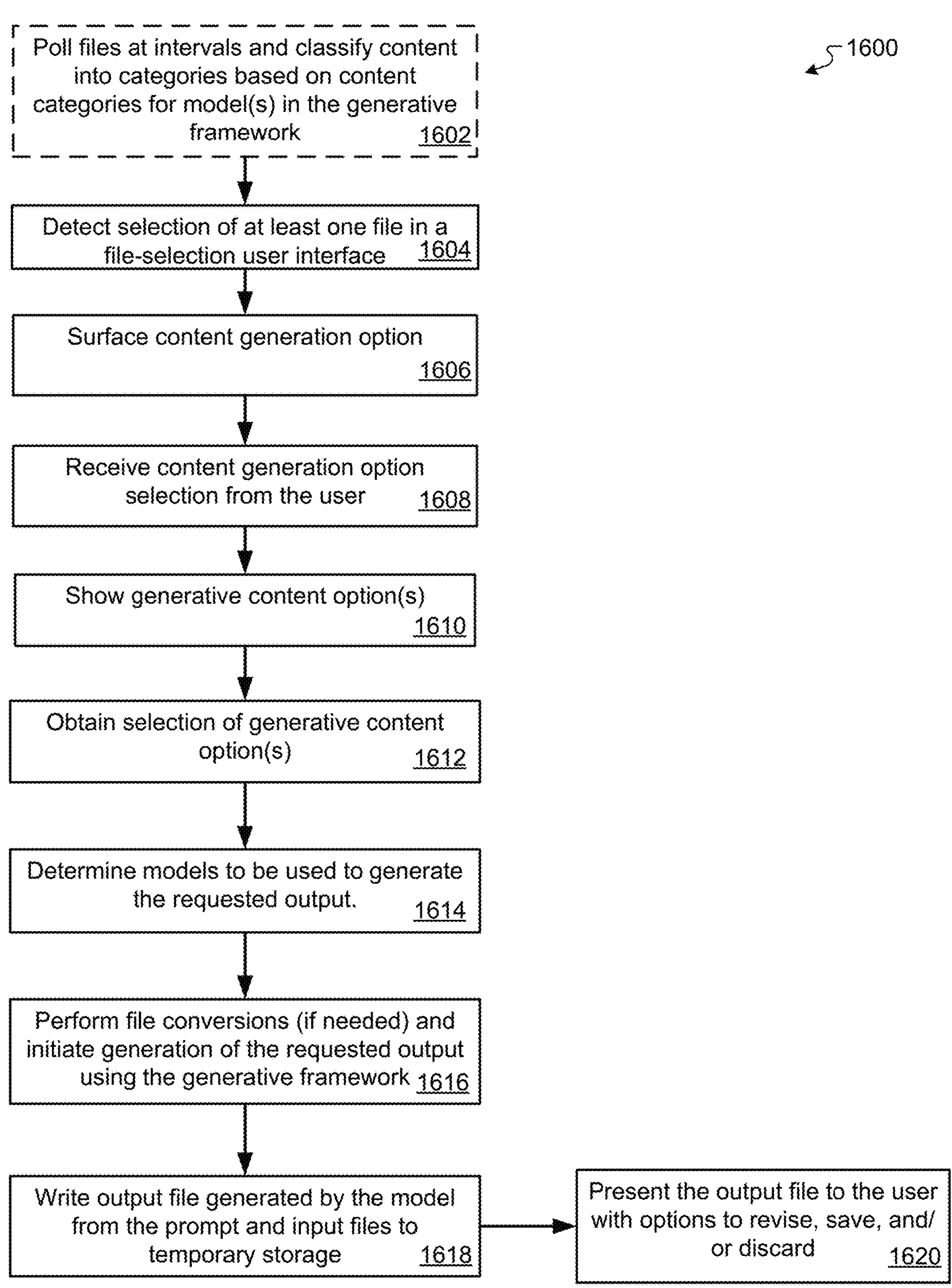
FIG. 16 illustrates an example flowchart of a method for a multimodal generative framework, according to an implementation.

FIG. 16 illustrates an example flowchart of a method 1600 for a multimodal generative framework, according to an implementation. The method 1600 may be executed by system, such as file system 450 and generative framework 405 of FIG. 4C. In a multimodal generative framework, a framework delegator, such as input distributor 420 of FIG. 4C, can determine whether the combined output of multiple generative models can generate the results the user has prompted. In the multimodal framework, the distributor may also include an output coordinator configured to compile the multiple outputs to create a single piece of content. Using such a multimodal framework may mean the flexibility of the system for accepting different file inputs and/or generating different outputs may be improved. The multimodal framework can leverage the individual strengths of multiple generative models to generate a desired output.

In the example of FIG. 16, at operation 1602, the system may analyze the files accessible via the file system and group the files into affinity groupings based on the file content. This step is similar to operation 1002 as described with respect to FIG. 10, except that in operation 1602, groupings need not be based on which file types (or formats) a single model can take as input. In other words, each affinity group can be associated with one or more generative models available in the generative framework. The distributor may determine which model or models are used to generate an output for the files included in the affinity group. Operation 1602 may be included in implementations that support proactive suggestions in a multimodal generative framework, but not all implementations need to support proactive suggestions.

At operation 1604, the system detects selection of at least one file in a file-selection user interface. In response to detection of at least one file, at operation 1606 the system may surface an option (e.g., a selectable control, such as a menu option, button, link, etc.) for generating new content using the selected file. Content generation option 610 of FIG. 6A, content generation option 1110 of FIG. 11, and content generation option 1410 of FIG. 14 illustrate non-limiting examples of a content generation option. At operation 1608 the system receives a selection of the content generation option. In other words, the user has selected the content generation option, indicating intent to generate content from the grouped files.

At operation 1610 the system may display a user interface with generative content options for the user to provide. The generative content options can include output types available from the available (registered) models in the generative framework. In some implementations, the generative content options can include prompt input suggestions. In some implementations the prompt suggestions may be associated with an affinity group. In some implementations the prompt suggestions may be associated with a model of the registered models. In some implementations, the generative content options can include prompt formatting requirements, if they exist, for a model or models registered with the generative framework. Operation 1610 includes displaying the generative content options for selection by the user. One or more of the prompt formatting requirements may be dependent on the type of output selected. Accordingly, in some implementations the system may display prompt input suggestions and/or the prompt formatting requirements appropriate for the output file type selected by the user. This may reduce the likelihood of incorrect prompts being provided by a user, which could otherwise lead to unnecessary processing and power consumption. In some implementations, default generative content options may be associated with an affinity grouping. FIG. 7 and FIG. 12 illustrate non-limiting example user interfaces that display generative content options and are configured to receive user selection of the options.

At operation 1612 the system obtains selection of the generative content options. The generative content options include at least a prompt and an output type. In one example, the system receives selection of the generative content options in response to the user selecting a control, such as submission control 720 of FIG. 7 or submission control 1220 of FIG. 12. In some examples, the submission control may be active once a prompt and an output type have been selected. In response to receiving the selection of the generative content options, at operation 1614 the system may determine which available models in the generative framework can be used to generate the results the user prompted (e.g., via the prompt and output file type), including whether the output of one model may be used as input for another model in accomplishing the task.

At operation 1616, the system may perform any file conversions needed and initiate the generation of the requested output using the generative framework. Initiating the generation of the requested output can include providing the prompt and one or more files of a first file type to a first generative model and providing the prompt and one or more files of a second file type to a generative second model. The output of the two generative models may be combined for the output file. In some implementations the output of the two models may be provided as input to a third generative model and the output of the third generative model may be the output file. Initiating generation of the requested output can include providing the prompt and the set of files to a first model and providing the output of that model and the prompt or a subset of the prompt to another model.

At operation 1618, the system receives the output file generated by the generative framework and writes the output file to a memory in the client device. The memory may be a temporary storage location, e.g., a "downloads" directory or a "temporary" directory or cache memory. At operation 1620 the system may generate a user interface that presents the output file to the user, similar to operation 1018 of FIG. 10 and/or operation 524 of FIG. 5.

In some aspects, the techniques described herein relate to a method, including: generating first embedded content by executing a generative model using first content as input; generating second embedded content by executing the generative model using second content as input; and associating the first embedded content with a first reference to the first content in an index and associating the second embedded content with a second reference to the second content in the index.

In some aspects, the techniques described herein relate to a method, further including: determining that a third content has changed; generating a third embedded content by executing the generative model using the third content as input; and associating the third embedded content with a third reference to the third content in the index.

In some aspects, the techniques described herein relate to a method, wherein the first content comes from a first file and the method further includes: extracting the first content from the first file having a file type using a content extractor based on the file type.

In some aspects, the techniques described herein relate to a method, wherein the first content is saved on a file on a user device and the second content is saved on a file on a server device.

In some aspects, the techniques described herein relate to a method, further including: determining that the first embedded content is within a threshold of similarity to a second embedded content; and in response to determining that the first embedded content is within a threshold of similarity to a second embedded content, generating a grouping for the first embedded content and the second embedded content in the index.

In some aspects, the techniques described herein relate to a method, wherein the index is saved on a user device.

In some aspects, the techniques described herein relate to a method, wherein the generative model is trained with webpage content.

In some aspects, the techniques described herein relate to a non-transitory computer-readable medium storing instructions that, when executed by at least one processor, cause a computing device to perform operations including: generating a first embedded content by executing a generative model using first content as input; generating a second embedded content by executing the generative model using second content as input; and associating the first embedded content with a first reference to the first content in an index and associating the second embedded content with a second reference to the second content in the index.

In some aspects, the techniques described herein relate to a method, further including: providing the query and the set of files to a generative model, the generative model generating new content in an output file based on the query and content of the set of files; and providing an output of the generative model as part of the response to the query.

In some aspects, the techniques described herein relate to a method, further including: extracting the content from a file having a file type using a content extractor based on the file type.

In some aspects, the techniques described herein relate to a method, wherein the representation is an embedding obtained by providing the query to a generative model, the generative model providing the embedding as output.

In some aspects, the techniques described herein relate to a method, wherein the generative model is trained with webpage content.

In some aspects, the techniques described herein relate to a system, wherein the memory is further configured with instructions to: provide the query and the set of files to a generative model, the generative model generating new content in an output file based on the query and content of the set of files; and provide an output of the generative model as part of the response to the query.

In some aspects, the techniques described herein relate to a system, wherein the memory is further configured with instructions to: extracting the content from a file having a file type using a content extractor based on the file type.

In some aspects, the techniques described herein relate to a system, wherein the representation is an embedding obtained by providing the query to a generative model, the generative model providing the embedding as output.

In some aspects, the techniques described herein relate to a system, wherein the generative model is trained with webpage content.

In some aspects, the techniques described herein relate to a method, wherein the output file is saved in a temporary storage location.

In some aspects, the techniques described herein relate to a method, further including registering the generative model with the framework, wherein a registration of the generative model includes information identifying at least one file format accepted by the generative model and at least one file format generated by the generative model.

In some aspects, the techniques described herein relate to a method, further including adding the generative model to a list of generative models available in the framework.

In some aspects, the techniques described herein relate to a method, wherein the user interface further displays suggested prompts for the generative model.

In some aspects, the techniques described herein relate to a method, wherein the prompt is a prompt selected from the suggested prompts.

In some aspects, the techniques described herein relate to a method, further including providing a content generation option, the content generation option configured to, in response to selection, provide the user interface.

In some aspects, the techniques described herein relate to a method, further including: receiving a set of files including a file of a first file type and a file of a second file type; determining that no model in the framework accepts the first file type and the second file type; and making a content generation option inactive, the content generation option configured to, in response to selection, provide the user interface.

In some aspects, the techniques described herein relate to a method, wherein identifying the generative model includes determining that a first file format of the file is not accepted as input can be converted to a second file format that is accepted as input by the generative model.

In some aspects, the techniques described herein relate to a method, wherein the file is a file in a set of files that excludes at least one file based on characteristics of the at least one file.

In some aspects, the techniques described herein relate to a method, wherein the characteristics include enterprise policy, a user identified as a creator of the at least one file, or a setting associated with a location of the at least one file.

In some aspects, the techniques described herein relate to a method, wherein the file is a file in a set of files and receiving the set of files includes: classifying content of a plurality of files into affinity groupings, the set of files being included in the plurality of files; storing file identifiers for the affinity groupings so that an affinity grouping is associated with two or more file identifiers; receiving a selection of a file in a particular affinity grouping of the affinity groupings; and in response to receiving the selection of the file in the particular affinity grouping, selecting the files associated with the particular affinity grouping as the set of files.

In some aspects, the techniques described herein relate to a method, wherein the particular affinity grouping is associated with the generative model.

In some aspects, the techniques described herein relate to a method, wherein receiving the selection of the file in the particular affinity grouping includes detecting a hover event over the file.

In some aspects, the techniques described herein relate to a method, wherein receiving the selection of the file in the particular affinity grouping includes selection of the file by the user.

In some aspects, the techniques described herein relate to a method, wherein the affinity grouping is a first affinity grouping and the file is associated with a second affinity grouping and the method further includes: displaying the first affinity grouping and the second affinity grouping as suggestions; and receiving a selection of the first affinity grouping.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are remote from each other and typically interact through a communication network. The relationship of client and server arises by virtue of computer programs running on the respective computers and having a client-server relationship with each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

We claim:

1. A method comprising:

providing a user interface that displays a prompt input area and a file selection area displaying files in a directory;

receiving a file selected by a user within the file selection area of the user interface;

identifying, from a framework configured to manage a first generative model that accepts a first format type, and a second generative model that accepts a second format type, the first generative model based on determining that a format type of the file is the first format type;

providing a prompt received from the prompt input area of the user interface and the file to the first generative model, the first generative model generating new content in an output file based on the prompt and content of the file; and saving the output file in the directory.

2. The method of claim 1, further comprising:

registering the second generative model with the framework, wherein a registration of the second generative model includes information identifying the second format type accepted by the second generative model; and adding the second generative model to a list of generative models available in the framework.

3. The method of claim 1, further comprising providing a content generation option, the content generation option configured to, in response to selection, provide the user interface.

4. The method of claim 1, wherein identifying the first generative model includes determining that the file is in a third format type that is not accepted as input to the first generative model, and converting the file to the first format type.

5. The method of claim 1, wherein the file is a file in a set of files that excludes at least one file based on characteristics of the at least one file, the characteristics including enterprise policy, a user identified as a creator of the at least one file, or a setting associated with a location of the at least one file.

6. The method of claim 1, wherein the file is a file in a set of files and receiving the set of files includes:

classifying content of a plurality of files into affinity groupings, the set of files being included in the plurality of files;

storing file identifiers for the affinity groupings so that an affinity grouping is associated with two or more file identifiers;

receiving a selection of a file in a particular affinity grouping of the affinity groupings; and in response to receiving the selection of the file in the particular affinity grouping, selecting files associated with the particular affinity grouping as the set of files.

7. The method of claim 6, wherein the particular affinity grouping is associated with the first generative model.

8. The method of claim 6, wherein receiving the selection of the file in the particular affinity grouping includes detecting a hover event over the file.

9. The method of claim 6, wherein receiving the selection of the file in the particular affinity grouping includes selection of the file by the user.

10. The method of claim 6, wherein the affinity grouping is a first affinity grouping and the file is associated with a second affinity grouping and the method further includes:

displaying the first affinity grouping and the second affinity grouping as suggestions; and receiving a selection of the first affinity grouping.

11. The method of claim 1, wherein the user interface displays at least two file types associated with the first generative model and the method further comprises:

receiving a selected output file type of the at least two file types, wherein the output file is generated as the selected output file type.

12. A system comprising:

a processor, and a memory configured with instructions to:

provide a user interface that displays a prompt input area and a file selection area displaying files in a directory;

receive a file selected by a user within the file selection area of the user interface;

identify, from a framework configured to manage a first generative model that accepts a first format type and a second generative model that accepts a second format type, the first generative model based on determining that a format type of the file is the first format type;

provide a prompt received from the prompt input area of the user interface and the file to the first generative model, the first generative model generating new content in an output file based on the prompt and content of the file; and save the output file.

13. The system of claim 12, wherein the memory is further configured with instructions to:

register the second generative model with the framework, wherein a registration of the second generative model includes information identifying the second format type accepted by the second generative model; and add the second generative model to a list of generative models available in the framework.

14. The system of claim 12, wherein the memory is further configured with instructions to:

provide a content generation option, the content generation option configured to, in response to selection, provide the user interface.

15. The system of claim 12, wherein identifying the first generative model includes determining that the file is in a third format type that is not accepted as input to the first generative model, and converting the file to the first format type.

16. The system of claim 12, wherein the file is a file in a set of files and the memory is further configured with instructions to:

receive the set of files including:

classifying content of a plurality of files into affinity groupings, the set of files being included in the plurality of files;

storing file identifiers for the affinity groupings so that an affinity grouping is associated with two or more file identifiers;

receiving a selection of a file in a particular affinity grouping of the affinity groupings; and in response to receiving the selection of the file in the particular affinity grouping, selecting files associated with the particular affinity grouping as the set of files, wherein the new content is generated based on the set of files.

17. The system of claim 16, wherein the particular affinity grouping is associated with the first generative model.

18. The system of claim 16, wherein receiving the selection of the file in the particular affinity grouping includes detecting a hover event over the file.

19. The system of claim 16, wherein the user interface displays at least two file types associated with the first generative model and the memory is further configured with instructions to:

receive a selected output file type of the at least two file types, wherein the output file is generated as the selected output file type.

20. A computer readable medium configured with instructions that, when executed on a processor, cause the processor to:

provide a user interface that displays a prompt input area and a file selection area;

receive a file selected by a user within the file selection area of the user interface;

identify, from a framework configured to manage a first generative model that accepts a first format type, and a second generative model that accepts a second format type, the first generative model based on determining that a format type of the file is the first format type;

provide a prompt received from the prompt input area of the user interface and the file to the first generative model using an API call, the first generative model generating new content in an output file based on the prompt and content of the file.

21. The computer readable medium of claim 20, further configured with instructions to:

register the second generative model with the framework, wherein a registration of the second generative model includes information identifying the second format type accepted by the second generative model; and add the second generative model to a list of generative models available in the framework.

22. The computer readable medium of claim 20, further configured with instructions to:

provide a content generation option, the content generation option configured to, in response to selection, provide the user interface.

23. The computer readable medium of claim 20, wherein identifying the first generative model includes determining that a file is in a third format type that is not accepted as input to the first generative model, and converting the file to the first format type.

24. The computer readable medium of claim 20, wherein the file is a file in a set of files and the computer readable medium is further configured with instructions to:

receive the set of files including:

classifying content of a plurality of files into affinity groupings, the set of files being included in the plurality of files;

storing file identifiers for the affinity groupings so that an affinity grouping is associated with two or more file identifiers;

receiving a selection of a file in a particular affinity grouping of the affinity groupings; and in response to receiving the selection of the file in the particular affinity grouping, selecting files associated with the particular affinity grouping as the set of files, wherein the new content is generated based on the set of files.

25. The computer readable medium of claim 24, wherein the particular affinity grouping is associated with the first generative model.

26. The computer readable medium of claim 24, wherein receiving the selection of the file in the particular affinity grouping includes detecting a hover event over the file.

27. The computer readable medium of claim 20, wherein the user interface displays at least two file types associated with the first generative model and the instructions are further configured to:

receive a selected output file type of the at least two file types, wherein the output file is generated as the selected output file type.

* * * * *